United States Patent
Liu

(10) Patent No.: US 12,096,474 B2
(45) Date of Patent: Sep. 17, 2024

(54) METHOD AND DEVICE FOR CONFIGURING BANDWIDTH PART

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 289 days.

(21) Appl. No.: 17/292,252

(22) PCT Filed: Nov. 12, 2018

(86) PCT No.: PCT/CN2018/115033
§ 371 (c)(1),
(2) Date: May 7, 2021

(87) PCT Pub. No.: WO2020/097757
PCT Pub. Date: May 22, 2020

(65) Prior Publication Data
US 2022/0007418 A1    Jan. 6, 2022

(51) Int. Cl.
*H04W 74/0816* (2024.01)
*H04W 72/044* (2023.01)
*H04W 74/00* (2009.01)

(52) U.S. Cl.
CPC ..... *H04W 74/0816* (2013.01); *H04W 72/044* (2013.01); *H04W 74/006* (2013.01)

(58) Field of Classification Search
CPC ........... H04W 74/0816; H04W 72/044; H04W 74/006
See application file for complete search history.

(56) References Cited

U.S. PATENT DOCUMENTS

| | | | |
|---|---|---|---|
| 2012/0087323 A1 | 4/2012 | Feng et al. | |
| 2012/0099439 A1* | 4/2012 | Baldemair | H04L 5/0094 370/241 |
| 2013/0329690 A1 | 12/2013 | Kim et al. | |
| 2016/0021646 A1* | 1/2016 | Hu | H04W 72/23 370/329 |
| 2017/0373780 A1* | 12/2017 | Ahn | H04L 27/2646 |
| 2018/0343663 A1* | 11/2018 | Richards | H04L 5/001 |
| 2019/0268971 A1* | 8/2019 | Talarico | H04W 76/27 |

(Continued)

FOREIGN PATENT DOCUMENTS

| | | |
|---|---|---|
| EP | 2706805 A2 | 3/2014 |
| WO | WO 2017172449 A1 | 10/2017 |
| WO | WO 2018203727 A1 | 11/2018 |

OTHER PUBLICATIONS

Indian Patent Application No. 202147024219 Office Action dated Apr. 6, 2022, 6 pages.

(Continued)

*Primary Examiner* — Kevin M Cunningham
(74) *Attorney, Agent, or Firm* — Cozen O'Connor

(57) ABSTRACT

A method for configuring a bandwidth part is provided. The method comprising: determining first target indication information for indicating whether each bandwidth part in the multiple bandwidth parts is available; and simultaneously transmitting the multiple bandwidth parts and the first target indication information to a terminal that supports simultaneous reception of the multiple bandwidth parts.

12 Claims, 20 Drawing Sheets

(56) References Cited

U.S. PATENT DOCUMENTS

2020/0154475 A1* 5/2020 Pao .................. H04L 1/0038
2023/0040353 A1* 2/2023 He ................... H04L 5/001

OTHER PUBLICATIONS

Japanese Patent Application No. 2021-525177 Office Action dated May 24, 2022, 5 pages.
Japanese Patent Application No. 2021-525177 English translation of Office Action dated May 24, 2022, 5 pages.
Panasonic "Wideband operation in NR unlicensed" 3GPP TSG-RAN WG1 Meeting #95 R1-1813099; Nov. 2018; 4 pages.
LG Electronics "Physical layer design of DL signals and channels for NR unlicensed" 3GPP TSG-RAN WG1 Meeting #95 R1-1812558; Nov. 2018; 9 pages.
Samsung "Discussion on UE adaptation schemes" 3GPP TSG-RAN WG1 Meeting #94bis R1-1810892; Oct. 2018; 7 pages.
ZTE; "Discussion on frame structure for NR-U" 23GPP TSG RAN WG1 Meeting #95 R1-1812432; Nov. 2018; 9 pages.
European Patent Application No. 18939954.6 extended Search and Opinion dated Jun. 14, 2022, 13 pages.
Korean Patent Application No. 10-2021-7015629 Office Action dated Jun. 28, 2022, 5 pages.
Korean Patent Application No. 10-2021-7015629 English translation of Office Action dated Jun. 28, 2022, 6 pages.
Japanese Patent Application No. 2021-525177, Office Action dated Dec. 20, 2022, 6 pages.
Japanese Patent Application No. 2021-525177, English translation of Office Action dated Dec. 20, 2022, 6 pages.
VIVO "Frame structure for NR-U operation" 3GPP TSG RAN WG1 Meeting #95, R1-1812297 Nov. 2018, 5 pages.

* cited by examiner

METHOD AND DEVICE FOR CONFIGURING BANDWIDTH PART

CROSS-REFERENCE TO RELATED APPLICATIONS

This application is a national phase of International Application No. PCT/CN2018/115033, filed on Nov. 12, 2018, the entire contents of which are incorporated herein by reference.

TECHNICAL FIELD

The disclosure relates to the communication field, and in particular to a method and an apparatus for configuring a bandwidth part.

BACKGROUND

A base station may support simultaneous transmission of multiple bandwidth parts under unlicensed spectrum in a 5G ($5^{th}$ generation mobile network) system, i.e., an NR (New Radio) system. However, a terminal may determine one activated bandwidth part in the multiple bandwidth parts only, and thus perform data transmission with the base station through this bandwidth part.

If a terminal is activated in a bandwidth part whose frequency value is in the middle in multiple bandwidth parts, but this bandwidth part is occupied by another terminal, for example, as illustrated in FIG. 1, the terminal may need to transmit data through other bandwidth parts. However, the terminal side may not know which other bandwidth parts are available. If the middle bandwidth part is occupied, requirements of the related radio frequency indicator are also higher when the base station transmits the multiple bandwidth parts simultaneously.

SUMMARY

According to a first aspect of embodiments of the disclosure, there is provided a method for configuring a bandwidth part. The method is applicable to a base station that supports simultaneous transmission of multiple bandwidth parts. The method may include the following.

First target indication information is determined. The first target indication information may be for indicating whether each bandwidth part in the multiple bandwidth parts is available.

The multiple bandwidth parts and the first target indication information are simultaneously transmitted to a terminal that supports simultaneous reception of the multiple bandwidth parts.

Optionally, determining the first target indication information includes the following.

Listen-before-talk LBT is performed to each bandwidth part in the multiple bandwidth parts to obtain a LBT result corresponding to each bandwidth part.

In response that a LBT result corresponding to one bandwidth part in the multiple bandwidth parts is successful, a value corresponding to the bandwidth part is determined as a first preset value, otherwise the value corresponding to the bandwidth part is determined as a second preset value.

The value corresponding to each bandwidth part is sorted in a preset order as the first target indication information.

Optionally, simultaneously transmitting the multiple bandwidth parts and the first target indication information to the terminal that supports simultaneous reception of the multiple bandwidth parts includes the following.

A downlink control signaling is configured for the multiple bandwidth parts, the downlink control signaling for carrying the first target indication information.

The multiple bandwidth parts are simultaneously transmitted to the terminal after carrying the downlink control signaling on at least one bandwidth part in the multiple bandwidth parts.

Optionally, the bandwidth part for carrying the downlink control signaling is determined by a following manner.

Any one bandwidth part in the multiple bandwidth parts is used as the bandwidth part for carrying the downlink control signal.

Or, a bandwidth part whose LBT result is successful in the multiple bandwidth parts is used as the bandwidth part for carrying the downlink control signal.

Optionally, the method further includes the following.

Occupation duration information that a spare bandwidth part is occupied is configured. The spare bandwidth part is an unavailable bandwidth part in the multiple bandwidth parts.

The occupation duration information is transmitted to the terminal.

Optionally, transmitting the occupation duration information to the terminal include the following.

The occupation duration information is transmitted to the terminal through downlink control information.

Or, the occupation duration information is transmitted to the terminal through a radio resource control signaling.

Optionally, the method further includes the following.

Second target indication information is determined in response to satisfying a specified condition; the second target indication information for indicating whether each bandwidth part in the multiple bandwidth parts is available, and a number of available bandwidth parts indicated by the second target indication information being different from a number of available bandwidth parts indicated by the first target indication information.

The second target indication information is transmitted to the terminal.

Optionally, the specified condition includes the following.

An amount of data change of downlink data to be transmitted exceeds a preset value.

Or, a request message from the terminal for requesting to change a number of available bandwidth parts in the multiple bandwidth parts is received.

Optionally, transmitting the second target indication information to the terminal includes the following.

The second target indication information is transmitted to the terminal through a radio resource control signaling.

Or, the second target indication information is transmitted to the terminal through a downlink control signaling.

According to a second aspect of embodiments of the disclosure, there is provided a method for configuring a bandwidth part. The method is applicable to a terminal that supports simultaneous reception of multiple bandwidth parts. The method may include the following.

The multiple bandwidth parts and first target indication information simultaneously transmitted by a base station, are received. The first target indication information may be for indicating whether each bandwidth part in the multiple bandwidth parts is available.

At least one available bandwidth part is determined among the multiple bandwidth parts based on the first target indication information.

Data transmission with the base station is performed from a first target time unit through the at least one available bandwidth part; the first target time unit being a time unit following a time unit of receiving by the terminal the first target indication information.

Optionally, at least one bandwidth part in the multiple bandwidth parts carries a downlink control signaling, and the downlink control signaling carries the first target indication information.

Optionally, determining the at least one available bandwidth part among the multiple bandwidth parts based on the first target indication information includes the following.

A value corresponding to each bandwidth part is determined through a preset order based on the first target indication information.

The bandwidth part to be available is determined in response that the value corresponding to one bandwidth part in the multiple bandwidth parts is a first preset value.

The bandwidth part to be unavailable is determined in response that the value corresponding to the bandwidth part is a second preset value.

Optionally, the method further includes the following.

Occupation duration information that a spare bandwidth part is occupied is determined. The spare bandwidth part is an unavailable bandwidth part in the multiple bandwidth parts.

Optionally, determining the occupation duration information that the spare bandwidth part is occupied include any one of the following.

The occupation duration information transmitted by the base station is received through a downlink control signaling.

The occupation duration information transmitted by the base station is received through a radio resource control signaling.

The occupation duration information pre-defined in a protocol is obtained.

Optionally, the method further includes the following.

Data transmission with the base station is performed from a second target time unit through an available bandwidth part indicated by second target indication information in response to receiving the second target indication information from the base station; the second target time unit being a time unit following a time unit of receiving by the terminal the second target indication information.

Optionally, the method further includes the following before receiving the second target indication information from the base station.

A request message for requesting to change a number of available bandwidth parts in the multiple bandwidth parts is transmitted to the base station in response that an amount of data change of uplink data to be transmitted exceeds a preset value.

Optionally, the second target indication information from the base station is received by a following manner.

The second target indication information is received from the base station through a radio resource control signaling.

Or, the second target indication information is received from the base station through a downlink control signaling.

According to a third aspect of embodiments of the disclosure, there is provided an apparatus for configuring a bandwidth part. The apparatus is applicable to a base station that supports simultaneous transmission of multiple bandwidth parts. The apparatus may include a first determining module and a first transmitting module.

The first determining module is configured to determine first target indication information for indicating whether each bandwidth part in the multiple bandwidth parts is available.

The first transmitting module is configured to simultaneously transmit the multiple bandwidth parts and the first target indication information to a terminal that supports simultaneous reception of the multiple bandwidth parts.

Optionally, the first determining module includes an execution sub-module, a first determining sub-module, and a second determining sub-module.

The execution sub-module is configured to perform listen-before-talk LBT to each bandwidth part in the multiple bandwidth parts to obtain a LBT result corresponding to each bandwidth part.

The first determining sub-module is configured to, in response that a LBT result corresponding to one bandwidth part in the multiple bandwidth parts is successful, determine a value corresponding to the bandwidth part as a first preset value, otherwise determine the value corresponding to the bandwidth part as a second preset value.

The second determining sub-module is configured to sort the value corresponding to each bandwidth part in a preset order as the first target indication information.

Optionally, the first transmitting module includes a signaling configuring sub-module and a first transmitting sub-module.

The signaling configuring sub-module is configured to configure a downlink control signaling for the multiple bandwidth parts, the downlink control signaling for carrying the first target indication information.

The first transmitting sub-module is configured to simultaneously transmit the multiple bandwidth parts to the terminal after carrying the downlink control signaling on at least one bandwidth part in the multiple bandwidth parts.

Optionally, the first transmitting sub-module includes a first determining unit or a second determining unit.

The first determining unit is configured to use any one bandwidth part in the multiple bandwidth parts as the bandwidth part for carrying the downlink control signal.

The second determining unit is configured to use a bandwidth part whose LBT result is successful in the multiple bandwidth parts as the bandwidth part for carrying the downlink control signal.

Optionally, the apparatus further includes a duration configuring module and a second transmitting module.

The duration configuring module is configured to configure occupation duration information that a spare bandwidth part is occupied; the spare bandwidth part being an unavailable bandwidth part in the multiple bandwidth parts.

The second transmitting module is configured to transmit the occupation duration information to the terminal.

Optionally, the second transmitting module includes a second transmitting sub-module or a third transmitting sub-module.

The second transmitting sub-module is configured to transmit the occupation duration information to the terminal through downlink control information.

The third transmitting sub-module is configured to transmit the occupation duration information to the terminal a radio resource control signaling.

Optionally, the apparatus further includes a second determining module and a third transmitting module.

The second determining module is configured to determine second target indication information in response to satisfying a specified condition; the second target indication information for indicating whether each bandwidth part in the multiple bandwidth parts is available, and a number of available bandwidth parts indicated by the second target indication information being different from a number of available bandwidth parts indicated by the first target indication information.

The third transmitting module is configured to transmit the second target indication information to the terminal.

Optionally, the specified condition includes the following.

An amount of data change of downlink data to be transmitted exceeds a preset value.

Or, a request message from the terminal for requesting to change a number of available bandwidth parts in the multiple bandwidth parts is received.

Optionally, the third transmitting module includes a fourth transmitting sub-module or a fifth transmitting sub-module.

The fourth transmitting sub-module is configured to transmit the second target indication information to the terminal through a radio resource control signaling.

The fifth transmitting sub-module is configured to transmit the second target indication information to the terminal through a downlink control signaling.

According to a fourth aspect of embodiments of the disclosure, there is provided an apparatus for configuring a bandwidth part. The apparatus is applicable to a terminal that supports simultaneous reception of multiple bandwidth parts. The apparatus may include a receiving module, a third determining module and a first data transmission module.

The receiving module is configured to receive the multiple bandwidth parts and first target indication information simultaneously transmitted by a base station; the first target indication information for indicating whether each bandwidth part in the multiple bandwidth parts is available.

The third determining module is configured to determine at least one available bandwidth part among the multiple bandwidth parts based on the first target indication information.

The first data transmission module is configured to perform data transmission with the base station from a first target time unit through the at least one available bandwidth part; the first target time unit being a time unit following a time unit of receiving by the terminal the first target indication information.

Optionally, at least one bandwidth part in the multiple bandwidth parts carries a downlink control signaling, and the downlink control signaling carries the first target indication information.

Optionally, the third determining module includes a third determining sub-module, a fourth determining sub-module and a fifth determining sub-module.

The third determining sub-module is configured to determine a value corresponding to each bandwidth part through a preset order based on the first target indication information.

The fourth determining sub-module is configured to determine the bandwidth part to be available in response that the value corresponding to one bandwidth part in the multiple bandwidth parts is a first preset value.

The fifth determining sub-module is configured to determine the bandwidth part to be unavailable in response that the value corresponding to the bandwidth part is a second preset value.

Optionally, the apparatus further includes a fourth determining module.

The fourth determining module is configured to determine occupation duration information that a spare bandwidth part is occupied; the spare bandwidth part being an unavailable bandwidth part in the multiple bandwidth parts.

Optionally, the fourth determining module includes any one of: a first receiving sub-module, a second receiving sub-module and an obtaining sub-module.

The first receiving sub-module is configured to receive the occupation duration information transmitted by the base station through a downlink control signaling.

The second receiving sub-module is configured to receive the occupation duration information transmitted by the base station through a radio resource control signaling.

The obtaining sub-module is configured to obtain the occupation duration information pre-defined in a protocol.

Optionally, the apparatus further includes a second data transmission module.

The second data transmission module is configured to perform data transmission with the base station from a second target time unit through an available bandwidth part indicated by second target indication information in response to receiving the second target indication information from the base station; the second target time unit being a time unit following a time unit of receiving by the terminal the second target indication information.

Optionally, the apparatus further includes a fourth transmitting module.

The fourth transmitting module is configured to transmit a request message for requesting to change a number of available bandwidth parts in the multiple bandwidth parts to the base station in response that an amount of data change of uplink data to be transmitted exceeds a preset value.

Optionally, the second data transmission module includes a third receiving sub-module, or a fourth receiving sub-module.

The third receiving sub-module is configured to receive the second target indication information from the base station through a radio resource control signaling.

The fourth receiving sub-module is configured to receive the second target indication information from the base station through a downlink control signaling.

According to a fifth aspect of embodiments of the disclosure, there is provided a computer-readable storage medium having stored therein computer instructions. The computer instructions may be for performing the method for configuring a bandwidth part as descried in the first aspect.

According to a sixth aspect of embodiments of the disclosure, there is provided a computer-readable storage medium having stored therein computer instructions. The computer instructions may be for performing the method for configuring a bandwidth part as descried in the second aspect.

According to a seventh aspect of embodiments of the disclosure, there is provided a device for configuring a bandwidth part. The device for configuring a bandwidth part is applicable to a base station that supports simultaneous transmission of multiple bandwidth parts.

In one embodiment, the device includes a processor.

In another embodiment, the device includes a memory for storing instructions executable by the processor.

In another embodiment, the processor is configured to perform the following.

First target indication information is determined. The first target indication information may be for indicating whether each bandwidth part in the multiple bandwidth parts is available.

The multiple bandwidth parts and the first target indication information are simultaneously transmitted to a terminal that supports simultaneous reception of the multiple bandwidth parts.

According to an eighth aspect of embodiments of the disclosure, there is provided a device for configuring a bandwidth part. The device for configuring a bandwidth part is applicable to a terminal that supports simultaneous reception of multiple bandwidth parts.

In one embodiment, the device includes a processor.

In another embodiment, the device includes a memory for storing instructions executable by the processor.

In another embodiment, the processor is configured to perform the following.

The multiple bandwidth parts and first target indication information simultaneously transmitted by a base station, are received. The first target indication information may be for indicating whether each bandwidth part in the multiple bandwidth parts is available.

At least one available bandwidth part is determined among the multiple bandwidth parts based on the first target indication information.

Data transmission with the base station is performed from a first target time unit through the at least one available bandwidth part; the first target time unit being a time unit following a time unit of receiving by the terminal the first target indication information.

The technical solutions provided in embodiments of the disclosure may include the following beneficial effects.

In embodiment of the disclosure, the base station may determine the first target indication information for indicating whether each bandwidth part in the multiple bandwidth parts is available. Furthermore, the base station may simultaneously transmit the multiple bandwidth parts and the first target indication information to the terminal that supports simultaneous reception of the multiple bandwidth parts. The terminal may determine whether each bandwidth part is available based on the first target indication information. Requirements of the radio frequency indicator may be reduced on the base station side. It may be determined whether each bandwidth part in the multiple bandwidth parts is available on the terminal side. Therefore, requirements of high-efficiency communication on the multiple bandwidth parts may be satisfied.

In embodiments of the disclosure, the base station may perform the LBT to each bandwidth part of the multiple bandwidth parts to obtain the LBT result corresponding to each bandwidth part. If the LBT result corresponding to one bandwidth part in the multiple bandwidth parts is successful, the base station may determine that the bandwidth part is available, and determine the value corresponding to the bandwidth part as the first preset value. Otherwise, the value corresponding to the bandwidth portion may be determined as the second preset value. Furthermore, the value corresponding to each bandwidth part may be sorted in the preset order and used as the first target indication information. Through the above process, different preset values may be used to characterize whether each bandwidth part in the multiple bandwidth parts is available, which is easy to implement and has high availability.

In embodiments of the disclosure, the base station may configure the downlink control signaling for the multiple bandwidth parts that are transmitted simultaneously, and the downlink control signaling carries the first target indication information. Furthermore, after carrying the downlink control signaling on at least one bandwidth part in the multiple bandwidth parts, the base station may simultaneously transmit the multiple bandwidth parts to the terminal. It is convenient for the terminal to subsequently determine whether each bandwidth part is available based on the target indication information carried in the downlink control signaling, and the availability is high.

In embodiments of the disclosure, optionally, the base station may use any one bandwidth part in the multiple bandwidth parts as the bandwidth part for carrying the downlink control signal. Or, the base station may use the bandwidth part whose LBT result is successful in the multiple bandwidth parts as the bandwidth part for carrying the downlink control signal. It may ensure that the terminal side may accurately receive the first target indication information.

In embodiments of the disclosure, optionally, the base station may also configure the occupation duration information that the spare bandwidth part is occupied, in which the spare bandwidth part is the unavailable bandwidth part in the multiple bandwidth parts. Furthermore, the base station may transmit the occupation duration information to the terminal. In embodiments of the disclosure, in addition to making it clear whether each bandwidth part in the multiple bandwidth parts is available on the terminal side, the terminal side may also clearly know how long the unavailable bandwidth part will be occupied and use resources in different bandwidth parts more reasonably.

In embodiments of the disclosure, optionally, the base station may transmit the occupation duration information to the terminal through the downlink control information. Since the duration of the scheduling period corresponding to the downlink control information is relatively small, the duration that the spare bandwidth part is occupied may be quickly updated for the terminal side. Alternatively, the base station may also transmit the occupation duration information to the terminal through the radio resource control signaling. Of course, the base station may not need to configure the occupation duration information, but may pre-define the occupation duration information in the protocol. The terminal may directly determine the pre-defined occupation duration information subsequently. It is easy to implement and has a high availability.

In embodiments of the disclosure, the base station may also re-determine the second target indication information for the terminal when the specified condition is satisfied. The number of available bandwidth parts indicated by the second target indication information may be different from the number of available bandwidth parts indicated by the first target indication information. Furthermore, the base station may transmit the second target indication information to the terminal. In embodiments of the disclosure, the base station may reconfigure the number of available bandwidth parts for the terminal when the specified condition is satisfied. Therefore, resources in different bandwidth parts may be more reasonably used to satisfy different service requirements in the multiple bandwidth parts.

In embodiments of the disclosure, optionally, the base station may determine that it is necessary to reconfigure the second target indication information for the terminal when the amount of data change of the current downlink data to be transmitted exceeds the preset value. Or, the base station may determine that it is necessary to reconfigure the second target indication information for the terminal after receiving the request message from the terminal for requesting to change the number of available bandwidth parts in the multiple bandwidth parts. In the above process, the number of available bandwidth parts corresponding to the terminal may be adjusted based on the data amount corresponding to different services. Therefore, resources in different bandwidth parts may be more reasonably used to satisfy different service requirements in the multiple bandwidth parts.

In embodiments of the disclosure, the base station may transmit the second target indication information to the terminal through the radio resource control signaling or the downlink control signaling, so that the terminal starts to perform the data transmission with the base station from the second target time unit through the available bandwidth part indicated by the second target indication information. In embodiments of the disclosure, the base station may transmit the reconfigured second target indication information to the terminal through different signaling, so that the terminal may more reasonably use different bandwidth parts in the multi-bandwidth scenario.

In embodiments of the disclosure, the terminal may receive the multiple bandwidth parts and the first target indication information that are transmitted by the base station simultaneously; the first target indication information is for indicating whether each bandwidth part in the multiple bandwidth parts is available. The terminal may determine the available target bandwidth part among the multiple bandwidth parts based on the first target indication information and start to perform the data transmission with the base station through the available bandwidth part from the first target time unit, in which the first target time unit is the time unit following the time unit of receiving by the terminal the first target indication information. Through the above process, requirements of the radio frequency indicator may be reduced on the base station side. It may be determined whether each bandwidth part in the multiple bandwidth parts is available on the terminal side. Therefore, requirements of high-efficiency communication on the multiple bandwidth parts may be satisfied.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the disclosure is for the purpose of describing specific embodiments only and is not intended to limit the disclosure. As used in the disclosure and the appended claims, the singular forms "a," "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the disclosure, first information may be termed as second information; and similarly, second information may also be termed as first information. As used herein, the term "if" may be understood to mean "when" or "upon" or "in response to" depending on the context.

In embodiments of the disclosure, the base station may need to support simultaneous transmission of multiple bandwidth parts, and the terminal may need to support simultaneous reception of multiple bandwidth parts accordingly.

A method for configuring a bandwidth part, provided in embodiments of the disclosure, may be first introduced from the base station side.

Figure 1:
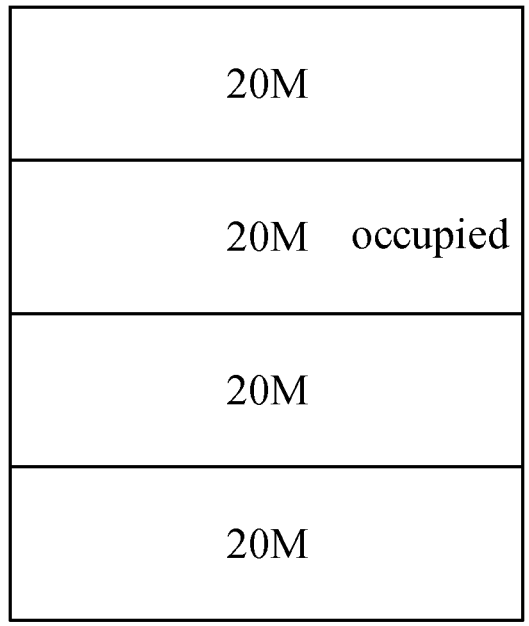
FIG. 1 is a schematic diagram of a scenario when a bandwidth part is occupied in the related art.
Figure 2:
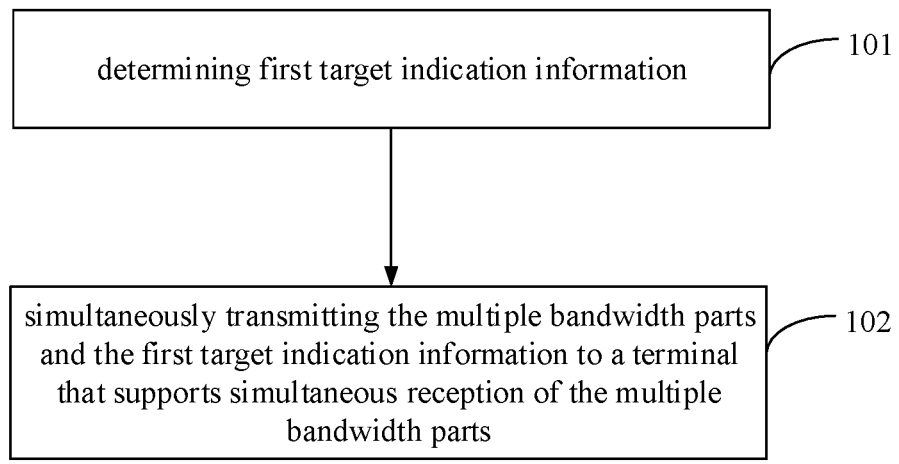
FIG. 2 is a flow chart illustrating a method for configuring a bandwidth part according to some exemplary embodiments.

Embodiments of the disclosure provide a method for configuring a bandwidth part, which is for the base station that supports simultaneous transmission of multiple bandwidth parts. Referring to FIG. 2, FIG. 2 is a flow chart illustrating a method for configuring a bandwidth part according to some exemplary embodiments. The method may include the following.

At block 101, first target indication information is determined. The first target indication information is for indicating whether each bandwidth part in the multiple bandwidth parts is available.

At block 102, the multiple bandwidth parts and the first target indication information are simultaneously transmitted to the terminal that supports simultaneous reception of the multiple bandwidth parts.

In the above embodiments, the base station may determine the first target indication information for indicating whether each bandwidth part in the multiple bandwidth parts is available. Furthermore, the base station may simultaneously transmit the multiple bandwidth parts and the first target indication information to the terminal that supports simultaneous reception of the multiple bandwidth parts. The terminal may determine whether each bandwidth part is available based on the first target indication information. Requirements of the radio frequency indicator may be reduced on the base station side. It may be determined whether each bandwidth part in the multiple bandwidth parts is available on the terminal side. Therefore, requirements of high-efficiency communication on the multiple bandwidth parts may be satisfied.

Figures 3, 4:
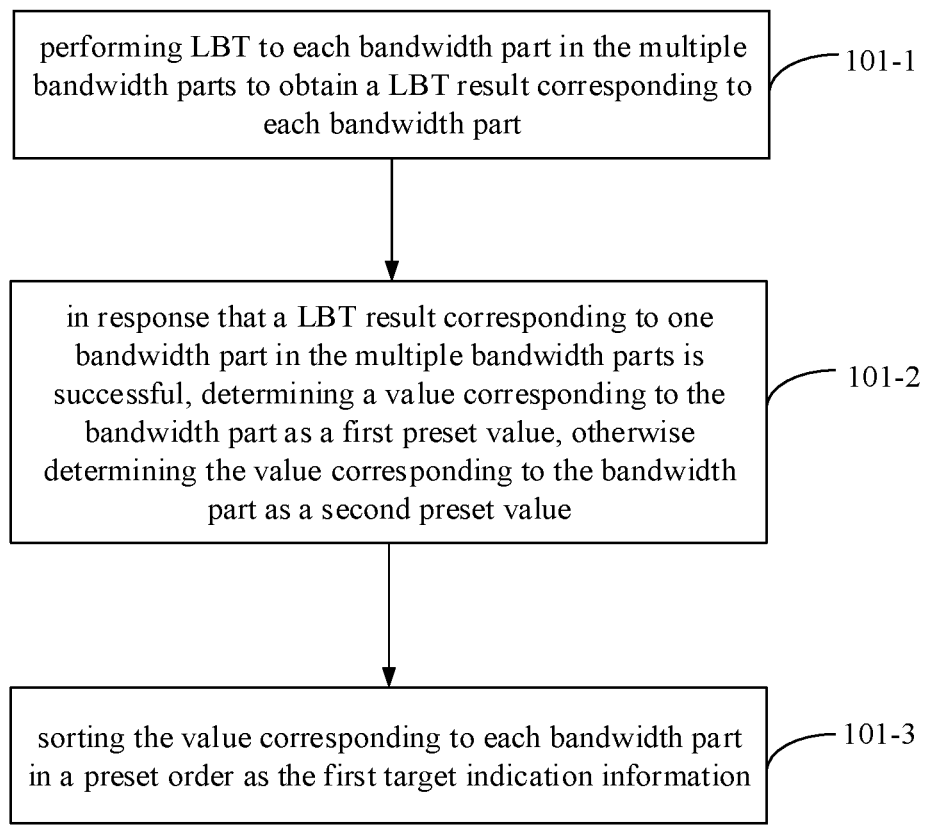
FIG. 3 is a flow chart illustrating another method for configuring a bandwidth part according to some exemplary embodiments.
FIG. 4 is a schematic diagram of a configuration scenario of a bandwidth part according to some exemplary embodiments.

For the action at block 101, referring to FIG. 3, FIG. 3 is a flow chart illustrating another method for configuring a bandwidth part according to some exemplary embodiments illustrated in FIG. 2. The action at block 101 may include the following.

At block 101-1, listen-before-talk (LBT) is performed to each bandwidth part in the multiple bandwidth parts to obtain a LBT result corresponding to each bandwidth part.

In this action, the base station may perform the LBT respectively to each bandwidth part in the multiple bandwidth parts transmitted simultaneously to obtain the LBT result corresponding to each bandwidth part.

At block 101-2, a value corresponding to the bandwidth part is determined as a first preset value in response that a LBT result corresponding to one bandwidth part in the multiple bandwidth parts is successful, otherwise the value corresponding to the bandwidth part is determined as a second preset value.

In this action, the base station may use the first preset value to characterize that the bandwidth part is available. That is, when the LBT result of a certain bandwidth part is successful, the value corresponding to this bandwidth part is determined as the first preset value.

For example, as illustrated in FIG. 4, the LBT results of the bandwidth part 1, the bandwidth part 2 and the bandwidth part 4 are successful, and it indicates that the above three bandwidth parts are available. The values corresponding to the bandwidth part 1, the bandwidth part 2 and the bandwidth part 4 are all the first preset value. Optionally, the first preset value may be 1.

In this action, the base station may also use the second preset value to characterize that the current bandwidth part is unavailable. That is, when the LBT result of a certain bandwidth part is failure, the value corresponding to this bandwidth part is determined as the second preset value.

For example, as illustrated in FIG. 4, the LBT result of the bandwidth part 3 is failure, and it indicates that the bandwidth part 3 is not available now. The value corresponding to the bandwidth part 3 is the second preset value. Optionally, the second preset value may be 0.

At block 101-3, the value corresponding to each bandwidth part is sorted in a preset order as the first target indication information.

In this action, after determining the value corresponding to each bandwidth part, the base station may sort the value corresponding to each bandwidth part in the preset order, for example, based on the order of frequency values from low to high, to obtain the first target indication information.

For example, in FIG. 4, the first target indication information may include four values of 1, 1, 0, and 1 based on the order of frequency values from low to high.

Figure 5:
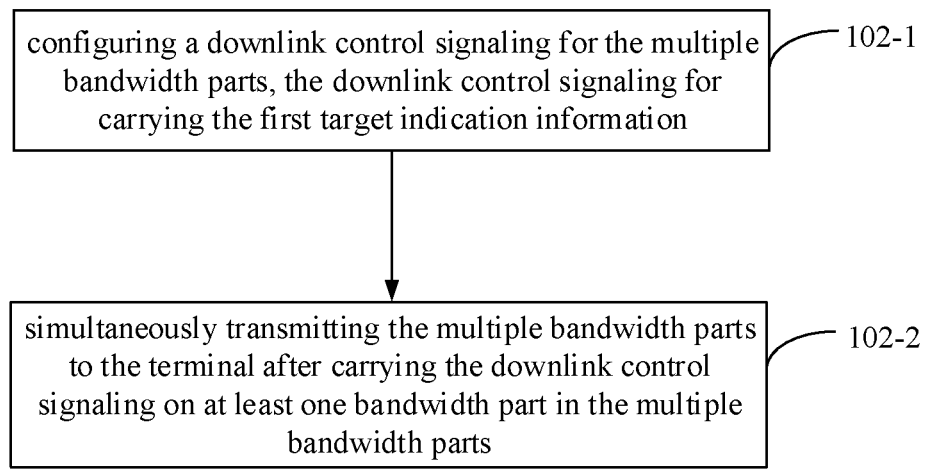
FIG. 5 is a flow chart illustrating another method for configuring a bandwidth part according to some exemplary embodiments.

For the action at block 102, referring to FIG. 5, FIG. 5 is a flow chart illustrating another method for configuring a bandwidth part according to some exemplary embodiments illustrated in FIG. 2. The action at block 102 may include the following.

At block 102-1, a downlink control signaling is configured for the multiple bandwidth parts. The downlink control signaling is for carrying the first target indication information.

In this action, the base station may configure the downlink control signaling for the multiple bandwidth parts transmitted simultaneously. The downlink control signaling may carry configuration information of PDSCH (Physical Downlink Shared Channel). Optionally, in embodiments of the disclosure, the downlink control signaling may also carry the first target indication information determined at block 101.

At block 102-2, the multiple bandwidth parts are simultaneously transmitted to the terminal after carrying the downlink control signaling on at least one bandwidth part in the multiple bandwidth parts.

In this action, the base station may carry the downlink control signaling on any one of the multiple bandwidth parts simultaneously transmitted. For example, the bandwidth part 2 may carry the downlink control signaling. Furthermore, the multiple bandwidth parts are simultaneously transmitted to the terminal.

Alternatively, the base station may carry the downlink control signaling on the bandwidth parts where the LBT results are successful among the multiple bandwidth parts. For example, as illustrated in FIG. 4, the base station may carry the same downlink control signaling on the bandwidth part 1, the bandwidth part 2, and the bandwidth part 4 at the same time. Furthermore, the multiple bandwidth parts are simultaneously transmitted to the terminal. It may ensure that the terminal may accurately obtain the target indication information corresponding to each bandwidth part.

Figure 6:
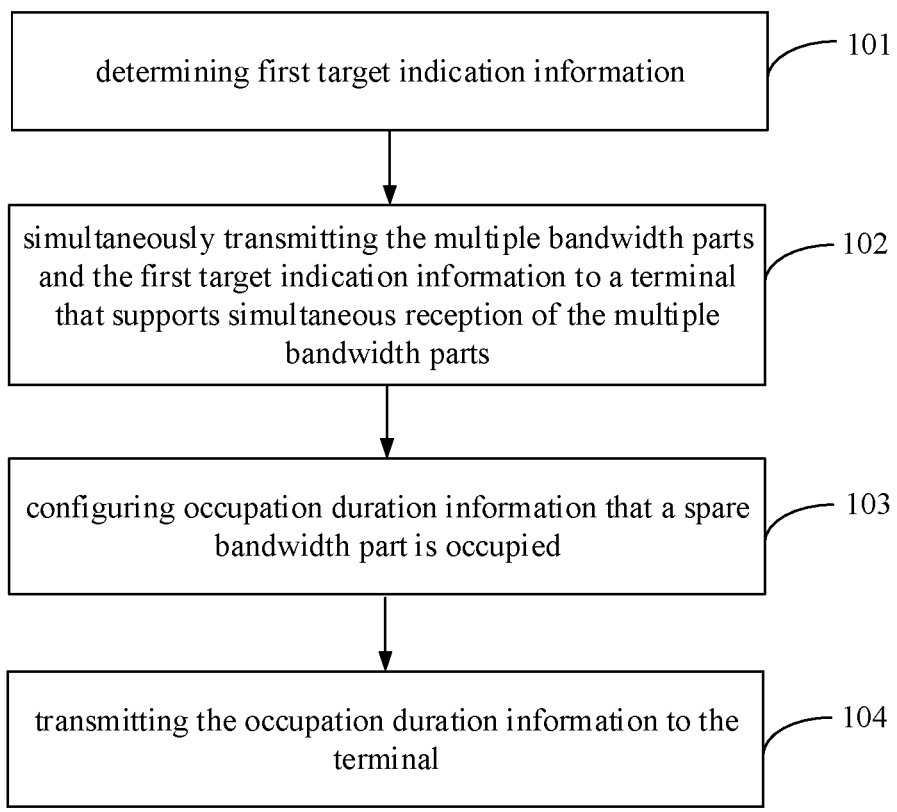
FIG. 6 is a flow chart illustrating another method for configuring a bandwidth part according to some exemplary embodiments.

In some embodiments, referring to FIG. 6, FIG. 6 is a flow chart illustrating another method for configuring a bandwidth part according to some exemplary embodiments illustrated in FIG. 2. The above method may further include the following.

At block 103, occupation duration information that a spare bandwidth part is occupied, is configured. The spare bandwidth part is an unavailable bandwidth part in the multiple bandwidth parts.

In embodiments of the disclosure, in addition to notifying the terminal of the available bandwidth parts among the multiple bandwidth parts, the base station may also configure the terminal with the occupation duration information that the unavailable bandwidth part is occupied.

For example, the occupation duration information that the unavailable bandwidth part 2 in FIG. 4 may be configured by the base station to be 2 time units. The time unit may be a time slot or a subframe.

At block 104, the occupation duration information is transmitted to the terminal.

In this action, the base station may transmit the occupation duration information to the terminal, so that the terminal determines the duration for which the spare bandwidth part is occupied. The terminal may determine whether to perform data transmission with the base station through the spare bandwidth part based on its own needs.

In some embodiments, the base station may transmit the occupation duration information to the terminal in time through the downlink control signaling. Since the downlink control signaling is the physical layer signaling, the duration of the corresponding scheduling period is relatively small. Therefore, it may quickly update the duration that the spare bandwidth part is occupied, for the terminal side.

In some embodiments, the base station may also configure the occupation duration information for the terminal through the RRC (Radio Resource Control) signaling.

In embodiments of the disclosure, optionally, the occupation duration information may also be pre-defined in the protocol, so that the base station may not need to configure the occupation duration information for the terminal, and the terminal may directly determine the occupation duration information based on the provisions of the protocol. That is, the base station may omit the actions at blocks 104 to 105.

In the above embodiments, the base station may transmit the occupation duration information to the terminal through the radio resource control information. Or, the base station may not need to configure the occupation duration information, but may pre-define the occupation duration information in the protocol. The terminal may directly determine the pre-defined occupation duration information subsequently. It is easy to implement and has a high availability.

Figure 7:
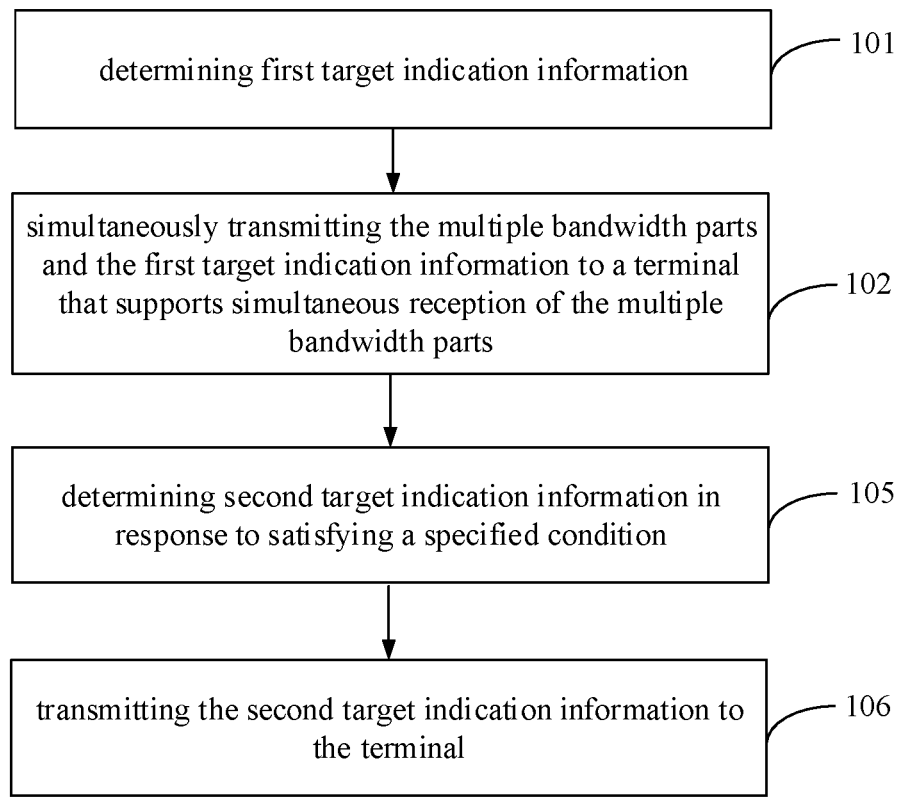
FIG. 7 is a flow chart illustrating another method for configuring a bandwidth part according to some exemplary embodiments.

In some embodiments, referring to FIG. 7, FIG. 7 is a flow chart illustrating another method for configuring a bandwidth part according to some exemplary embodiments illustrated in FIG. 2. The above method may further include the following.

At block 105, second target indication information is determined in response to satisfying a specified condition. The second target indication information is for indicating whether each bandwidth part in the multiple bandwidth parts is available. A number of available bandwidth parts indicated by the second target indication information is different from a number of available bandwidth parts indicated by the first target indication information.

In this action, in one case, the base station may determine that the specified condition is satisfied when the amount of data change of current downlink data to be transmitted exceeds a preset value.

For example, when the downlink data to be transmitted increases or decreases, and the amount of data increasing or decreasing exceeds the preset value, the base station may determine that it needs to adjust the number of available bandwidth parts.

At this time, the number of available bandwidth parts reconfigured by the base station for the terminal is different from the number of available bandwidth parts previously configured.

For example, the number of available bandwidth parts indicated in the first target indication information is 3, the downlink data to be transmitted decreases, and the amount of data decreasing exceeds the preset value. At this time, the number of available bandwidth parts indicated in the second target indication information may be less than 3, such as may be 1 or 2.

Or, the number of available bandwidth parts indicated in the first target indication information is 1, the downlink data to be transmitted increases, and the amount of data increasing exceeds the preset value. At this time, the number of available bandwidth parts indicated in the second target indication information may be greater than 1, for example may be 2, 3 or 4.

In another case, the base station may determine that the specified condition is satisfied based on the request message transmitted by the terminal.

If the uplink data currently transmitted by the terminal to the base station increases or decreases, and the amount of data increasing or decreasing exceeds the preset value, the terminal may transmit the request message for requesting the base station to change the number of available bandwidth parts in the multiple bandwidth parts to the base station. The base station reconfigures the second target indication information based on the request message.

For example, if the uplink data currently to be transmitted by the terminal to the base station increases, and the amount of data increasing exceeds the preset value, the terminal may transmit the request message to request the base station to increase the number of available bandwidth parts. Based on the request message, the base station increases the number of original available bandwidth parts.

Or, if the uplink data currently to be transmitted by the terminal to the base station decreases, and the amount of data decreasing exceeds the preset value, the terminal may transmit request message to request the base station to decrease the number of available bandwidth parts. Based on the request message, the base station decreases the number of original available bandwidth parts.

Optionally, by combining the occupation duration information and at the end of the time period when the unavailable bandwidth part is occupied, if the uplink data to be transmitted to the base station increases or decreases, and the amount of data change exceeds the preset value, the terminal may transmit the request message to the base station. The base station may determine the second target indication information based on the request message.

At block 106, the second target indication information is transmitted to the terminal.

In this action, the base station may transmit the second target indication information to the terminal through the RRC layer signaling or the downlink control signaling. The terminal starts to perform data transmission with the base station through the available bandwidth part indicated by the second target indication information from the next time unit of the time unit where the second target indication information is received, that is, from the second target time unit.

In the above embodiments, the base station may also re-determine the second target indication information for the terminal when the specified condition is satisfied. The number of available bandwidth parts indicated by the second target indication information may be different from the number of available bandwidth parts indicated by the first target indication information. Furthermore, the base station may transmit the second target indication information to the terminal. In embodiments of the disclosure, the base station may reconfigure the number of available bandwidth parts for the terminal when the specified condition is satisfied. Therefore, resources in different bandwidth parts may be more reasonably used to satisfy different service requirements in the multiple bandwidth parts.

A method for configuring a bandwidth part, provided in embodiments of the disclosure, may then be introduced from the terminal side.

Figure 8:
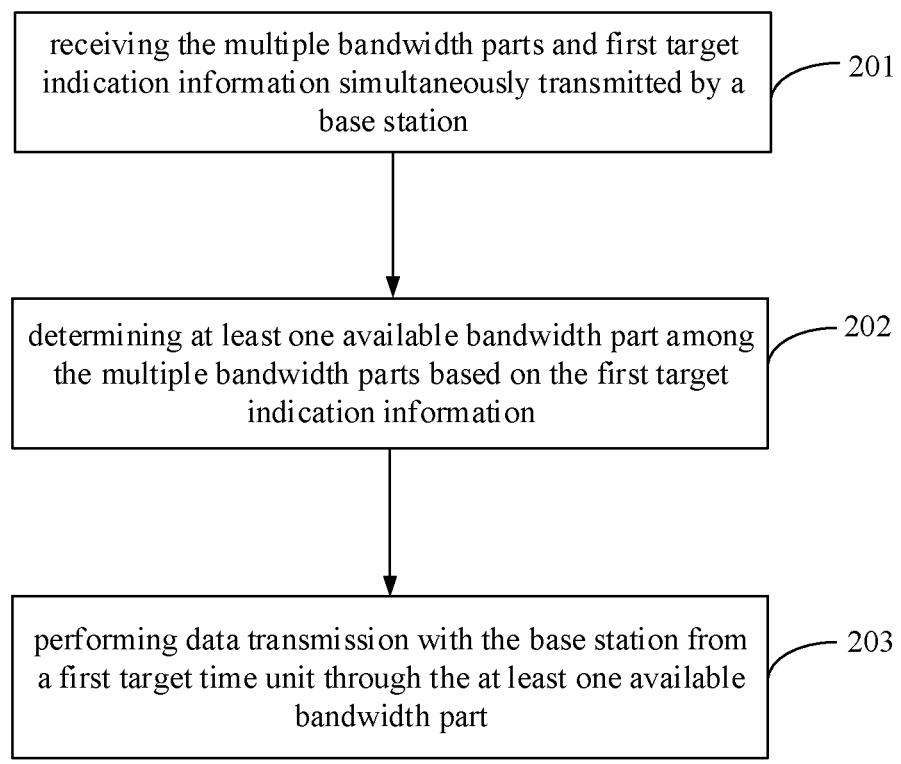
FIG. 8 is a flow chart illustrating another method for configuring a bandwidth part according to some exemplary embodiments.

Embodiments of the disclosure provide another method for configuring a bandwidth part, which is for the terminal that supports simultaneous reception of multiple bandwidth parts. Referring to FIG. 8, FIG. 8 is a flow chart illustrating another method for configuring a bandwidth part according to some exemplary embodiments. The method may include the following.

At block 201, the multiple bandwidth parts and first target indication information simultaneously transmitted by a base station, are received. The first target indication information is for indicating whether each bandwidth part in the multiple bandwidth parts is available.

At block 202, at least one available bandwidth part among the multiple bandwidth parts is determined based on the first target indication information.

At block 203, data transmission with the base station is performed from a first target time unit through the at least one available bandwidth part. The first target time unit is a time unit following a time unit of receiving by the terminal the first target indication information.

In the above embodiments, the terminal may receive the multiple bandwidth parts and the first target indication information that are transmitted by the base station simultaneously; the first target indication information is for indicating whether each bandwidth part in the multiple bandwidth parts is available. The terminal may determine the available target bandwidth part among the multiple bandwidth parts based on the first target indication information and start to perform the data transmission with the base station through the available bandwidth part from the first target time unit, in which the first target time unit is the time unit following the time unit of receiving by the terminal the first target indication information. Through the above process, requirements of the radio frequency indicator may be reduced on the base station side. It may be determined whether each bandwidth part in the multiple bandwidth parts is available on the terminal side. Therefore, requirements of high-efficiency communication on the multiple bandwidth parts may be satisfied.

For the above action at block 201, the terminal may receive the multiple bandwidth parts simultaneously transmitted by the base station, and at least one of the multiple bandwidth parts may carry the downlink control signaling. In embodiments of the disclosure, in addition to the configuration information of PDSCH in the related art, the downlink control signaling also carries the first target indication information.

Figure 9:
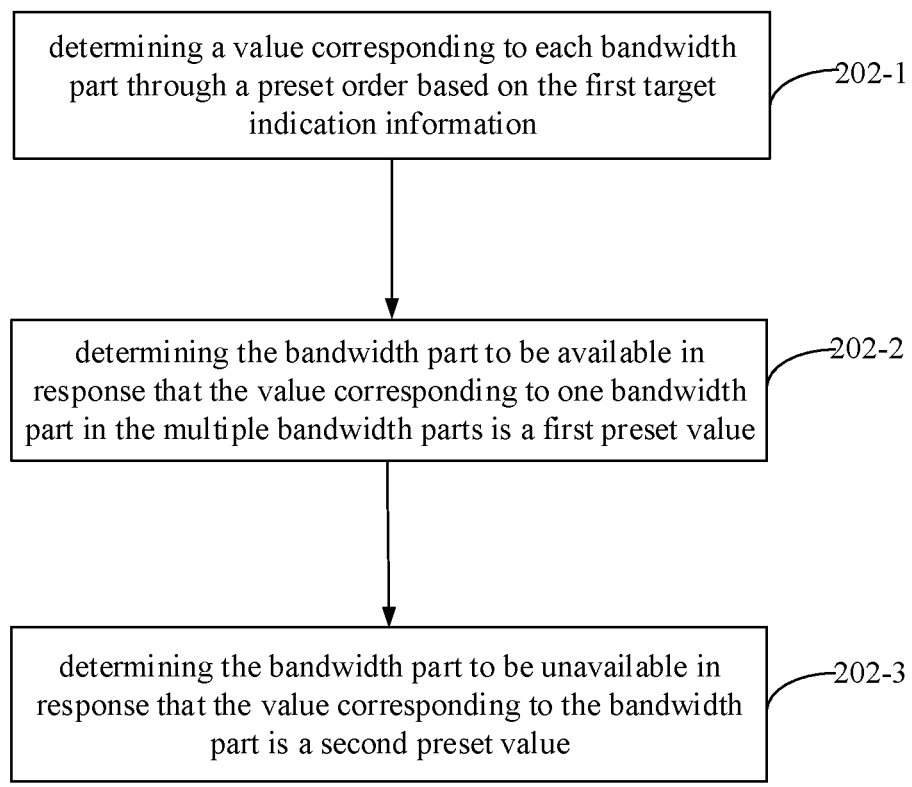
FIG. 9 is a flow chart illustrating another method for configuring a bandwidth part according to some exemplary embodiments.

For the above action at block 202, referring to FIG. 9, FIG. 9 is a flow chart illustrating another method for configuring a bandwidth part according to some exemplary embodiments illustrated in FIG. 8. The action at block 202 may include the following.

At block 202-1, a value corresponding to each bandwidth part is determined through a preset order based on the first target indication information.

In this action, it is assumed that the preset order is that the frequency values may be from low to high. If the first target indication information carried in the downlink control signaling includes 1, 1, 0, and 1, the terminal may determine the values corresponding to bandwidth parts 1-4 of frequency values from low to high, in turn are 1, 1, 0, and 1.

At block 202-2, the bandwidth part is determined to be available in response that the value corresponding to one bandwidth part in the multiple bandwidth parts is a first preset value.

In this action, it is assumed that the first preset value is 1, the terminal may determine that the bandwidth part 1 is available, the bandwidth part 2 is available, and the bandwidth part 4 is available.

At block 202-3, the bandwidth part is determined to be unavailable in response that the value corresponding to the bandwidth part is a second preset value.

In this action, it is assumed that the second preset value is 0, the terminal may determine that the bandwidth part 3 is unavailable.

For the above action at block 203, the time unit in which the terminal receives the first target indication information is $T_1$. The terminal may start the data transmission with the base station through at least one available bandwidth part starting at the next time unit $T_2$ following $T_1$. The time unit may be a subframe or a time slot.

In the above embodiments, the purpose of determining whether each bandwidth part in the multiple bandwidth parts is available on the terminal side, is achieved, and the high-efficiency communication requirement of the multiple bandwidth parts is satisfied.

Figure 10:
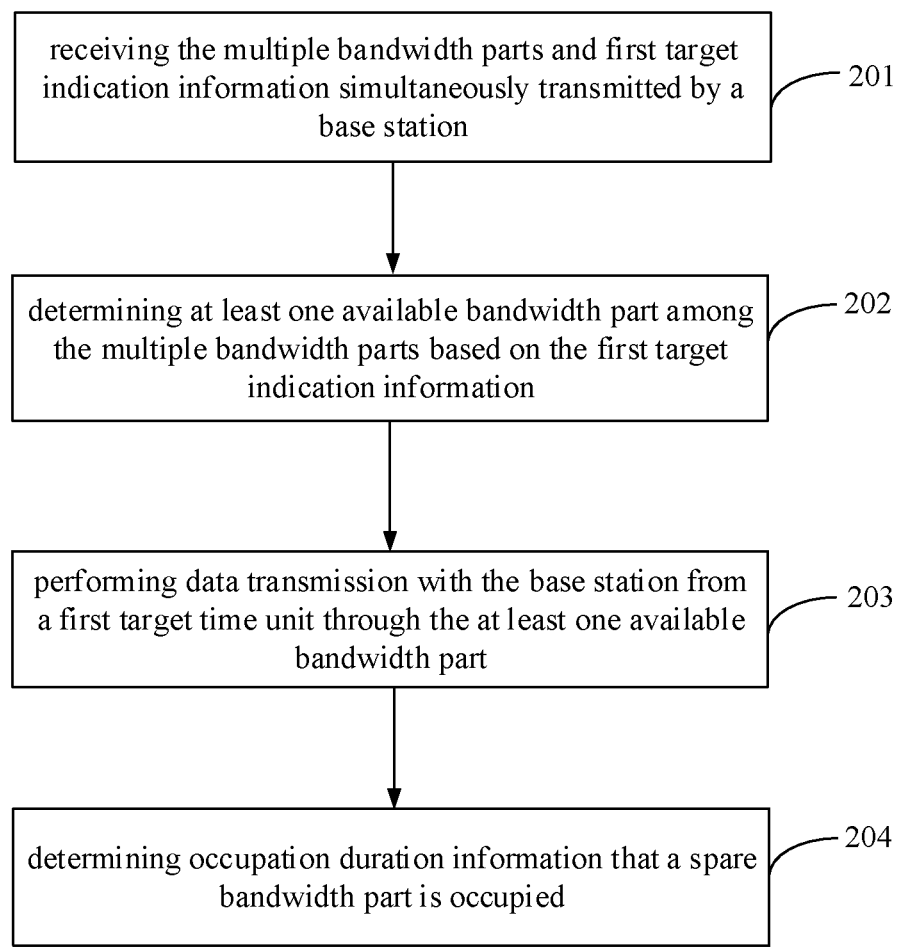
FIG. 10 is a flow chart illustrating another method for configuring a bandwidth part according to some exemplary embodiments.

In some embodiments, referring to FIG. 10, FIG. 10 is a flow chart illustrating another method for configuring a bandwidth part according to some exemplary embodiments illustrated in FIG. 8. The above method may further include the following.

At block 204, occupation duration information that a spare bandwidth part is occupied, is determined. The spare bandwidth part is an unavailable bandwidth part in the multiple bandwidth parts.

In this action, the terminal may use any one of the following ways to determine the occupation duration information.

In the first way, the occupation duration information transmitted by the base station through a downlink control signaling may be received.

In this way, the base station may carry the occupation duration information configured for the terminal in the downlink control signaling, and the terminal may directly obtain the occupation duration information in the downlink control signaling.

Since the duration of the scheduling period corresponding to the downlink control information is relatively small, the base station may quickly update the duration that the spare bandwidth part is occupied for the terminal side.

In the second way, the occupation duration information transmitted by the base station through a radio resource control signaling may be received.

In this way, the base station carries the occupation duration information configured for the terminal in the RRC signaling, and the terminal may directly obtain the occupation duration information in the downlink control signaling.

In the third way, the occupation duration information pre-defined in a protocol is obtained directly.

In this way, the base station may not need to configure the occupation duration information for the terminal. The occupation duration information has been previously defined in the protocol, and the terminal side may directly obtain the occupation duration information defined in the protocol.

The terminal may use any of the above ways to determine the occupation duration information.

In embodiments of the disclosure, after determining the occupation duration information, the terminal may subsequently determine whether to use the spare bandwidth part for data transmission at the end of the duration that the spare bandwidth part is occupied, based on its own service requirements.

In the above embodiments, in addition to making it clear whether each bandwidth part in the multiple bandwidth parts is available on the terminal side, the terminal side may also clearly know how long the unavailable bandwidth part will be occupied and use resources in different bandwidth parts more reasonably.

Figure 11:
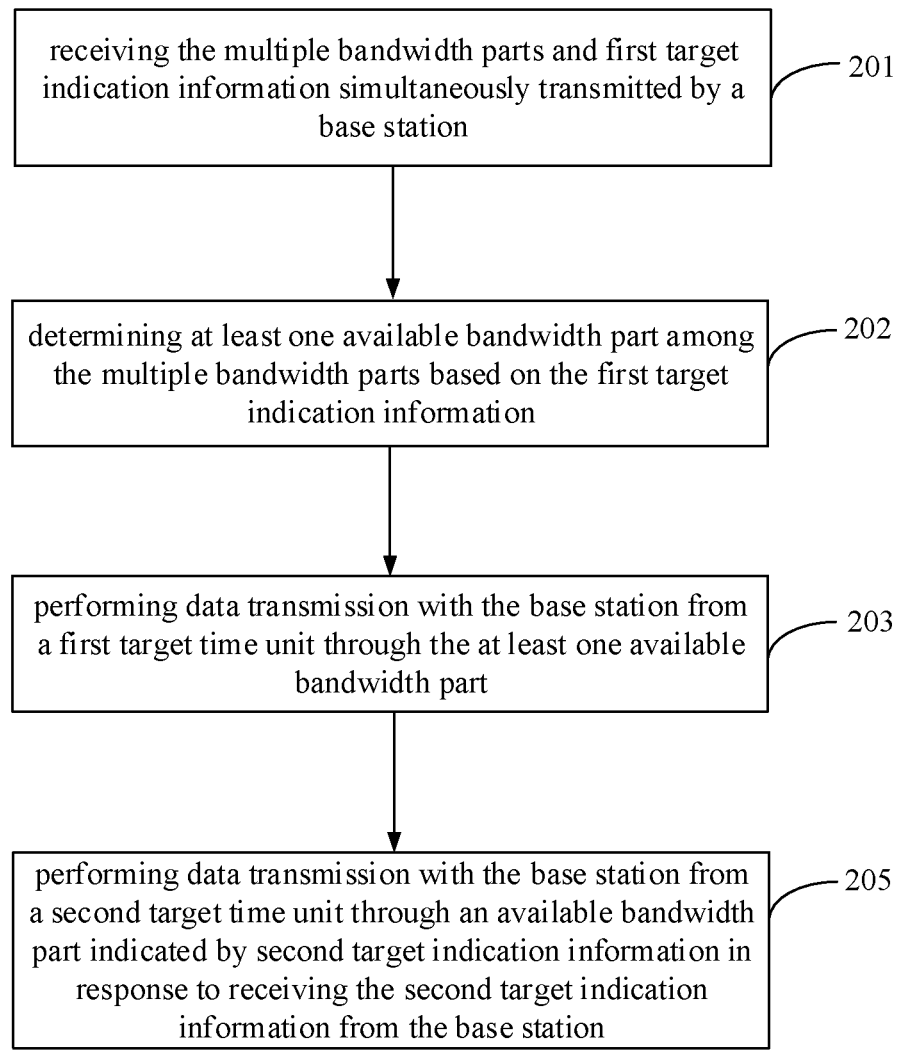
FIG. 11 is a flow chart illustrating another method for configuring a bandwidth part according to some exemplary embodiments.

In some embodiments, referring to FIG. 11, FIG. 11 is a flow chart illustrating another method for configuring a bandwidth part according to some exemplary embodiments illustrated in FIG. 8. The above method may further include the following.

At block 205, data transmission with the base station is performed from a second target time unit through an available bandwidth part indicated by second target indication information in response to receiving the second target indication information from the base station. The second target time unit is a time unit following a time unit of receiving by the terminal the second target indication information.

In this action, if the terminal receives the second target indication information transmitted by the base station, it means that the number of available bandwidth parts among the multiple bandwidth parts has changed. The terminal may start at the next time unit $T_4$ following the time unit $T_3$ that receives the second target indication information, that is, the second target time unit to perform data transmission with the base station through the reconfigured available bandwidth part.

In the above embodiments, the terminal may perform data transmission with the base station on the newly determined available bandwidth part based on the second target indication information transmitted by the base station, so that resources in different bandwidth parts may be more reasonably used to satisfy the requirements of different services in the multiple bandwidth parts.

Figure 12:
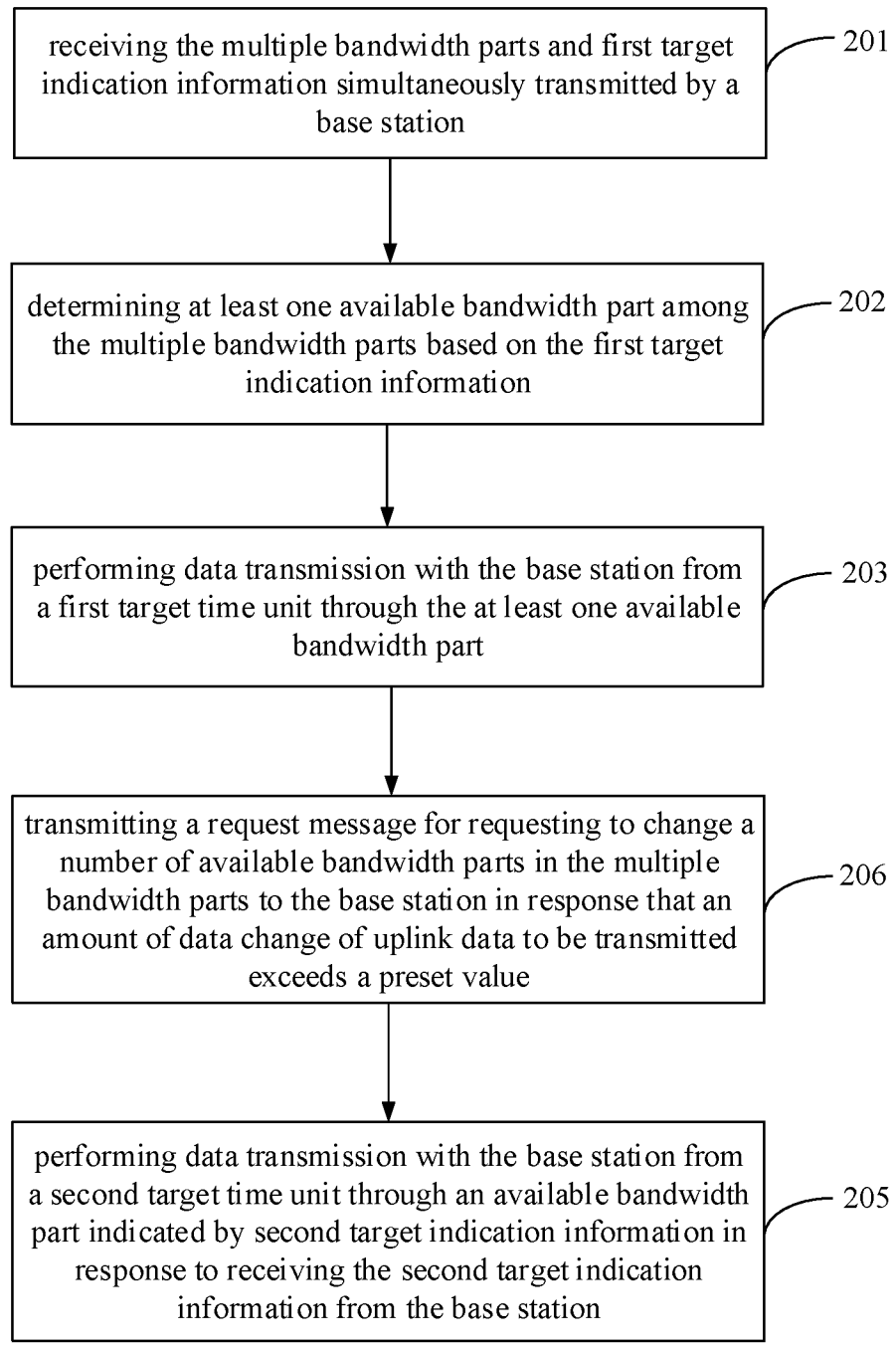
FIG. 12 is a flow chart illustrating another method for configuring a bandwidth part according to some exemplary embodiments.

In some embodiments, referring to FIG. 12, FIG. 12 is a flow chart illustrating another method for configuring a bandwidth part according to some exemplary embodiments illustrated in FIG. 11. The above method may further include the following before performing the action at block 205.

At block 206, a request message is transmitted for requesting to change a number of available bandwidth parts in the multiple bandwidth parts to the base station in response that an amount of data change of uplink data to be transmitted exceeds a preset value.

In this action, the terminal may transmit the request message to the base station when the amount of data change of uplink data to be transmitted exceed the preset value, for example, the amount of data increasing or decreasing exceeds the preset value. The base station may increase the number of available bandwidth parts or decrease the number of available bandwidth parts based on the request message.

In embodiments of the disclosure, the terminal side may also transmit the request message to the base station based on the occupation duration information, at the end of the time period that the unavailable bandwidth part is occupied, and the amount of data change of uplink data to be transmitted exceeding the preset value. The base station may increase the number of available bandwidth parts or decrease the number of available bandwidth parts.

In some embodiments, the base station may also change the number of available bandwidth parts based on the amount of data change of downlink data to be transmitted by the base station. The terminal directly performs data transmission with the base station based on the second target indication information transmitted by the base station, starting from the second target time unit, and using the available bandwidth part indicated by the second target indication information.

In some embodiments, the base station may transmit the second target indication information to the terminal through the RC signaling or the downlink control signaling. The terminal may receive it directly.

Figure 13:
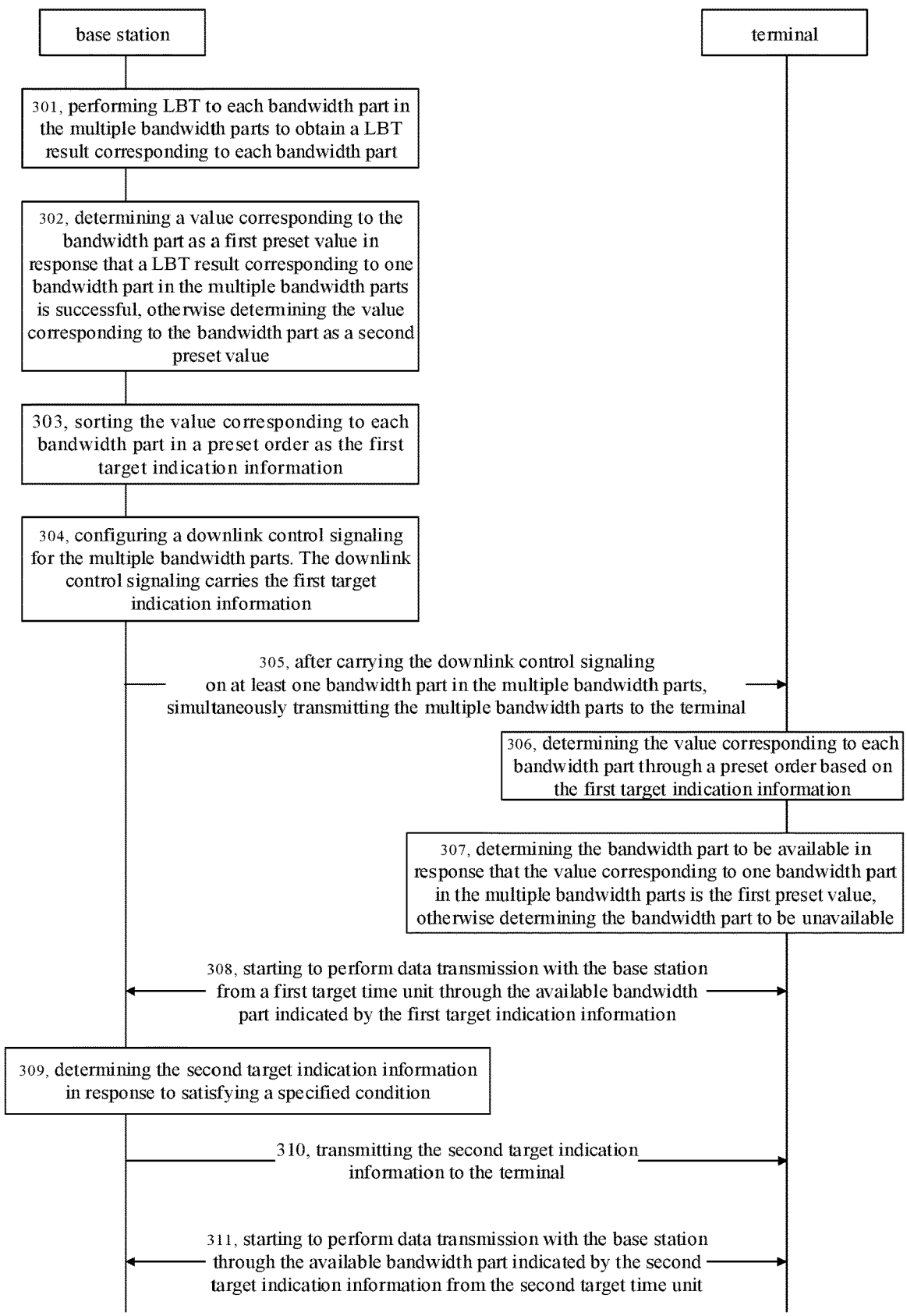
FIG. 13 is a flow chart illustrating another method for configuring a bandwidth part according to some exemplary embodiments.

In some embodiments, referring to FIG. 13, FIG. 13 is a flow chart illustrating another method for configuring a bandwidth part according to some exemplary embodiments. The method may include the following.

At block 301, the base station performs LBT to each bandwidth part in the multiple bandwidth parts to obtain a LBT result corresponding to each bandwidth part.

At block 302, the base station determines a value corresponding to the bandwidth part as a first preset value in response that a LBT result corresponding to one bandwidth part in the multiple bandwidth parts is successful, otherwise determines the value corresponding to the bandwidth part as a second preset value.

At block 303, the value corresponding to each bandwidth part is sorted in a preset order as the first target indication information.

At block 304, the base station configures a downlink control signaling for the multiple bandwidth parts, and the downlink control signaling carries the first target indication information.

Optionally, the downlink control signaling also carries occupation duration information that a spare bandwidth part is occupied. The spare bandwidth part is an unavailable bandwidth part in the multiple bandwidth parts.

At block 305, after carrying the downlink control signaling on at least one bandwidth part in the multiple bandwidth parts, the base station simultaneously transmits the multiple bandwidth parts to the terminal.

At block 306, the terminal determines the value corresponding to each bandwidth part through a preset order based on the first target indication information.

At block 307, the terminal determines the bandwidth part to be available in response that the value corresponding to one bandwidth part in the multiple bandwidth parts is the first preset value, otherwise determines the bandwidth part to be unavailable.

At block 308, the terminal starts to perform data transmission with the base station from a first target time unit through the available bandwidth part indicated by the first target indication information. The first target time unit is a time unit following a time unit of receiving by the terminal the first target indication information.

At block 309, the base station determines the second target indication information in response to satisfying a specified condition.

The second target indication information is for indicating whether each bandwidth part in the multiple bandwidth parts is available. A number of available bandwidth parts indicated by the second target indication information is different from a number of available bandwidth parts indicated by the first target indication information.

At block 310, the base station transmits the second target indication information to the terminal.

At block 311, the terminal starts to perform data transmission with the base station through the available bandwidth part indicated by the second target indication information from the second target time unit.

In the above embodiments, the base station may determine the first target indication information for indicating whether each bandwidth part in the multiple bandwidth parts is available. Furthermore, the base station may simultaneously transmit the multiple bandwidth parts and the first target indication information to the terminal that supports simultaneous reception of the multiple bandwidth parts. The terminal may determine whether each bandwidth part is available based on the first target indication information. Requirements of the radio frequency indicator may be reduced on the base station side. It may be determined whether each bandwidth part in the multiple bandwidth parts is available on the terminal side. Therefore, requirements of high-efficiency communication on the multiple bandwidth parts may be satisfied. In addition, the base station may also re-determine the number of available bandwidth parts for the terminal when the specified condition is satisfied. Therefore, resources in different bandwidth parts may be more reasonably used to satisfy different service requirements in the multiple bandwidth parts.

Corresponding to the foregoing embodiments of the application function implementation method, the disclosure also provides embodiments of the application function implementation apparatus, and a corresponding base station and terminal.

Figure 14:
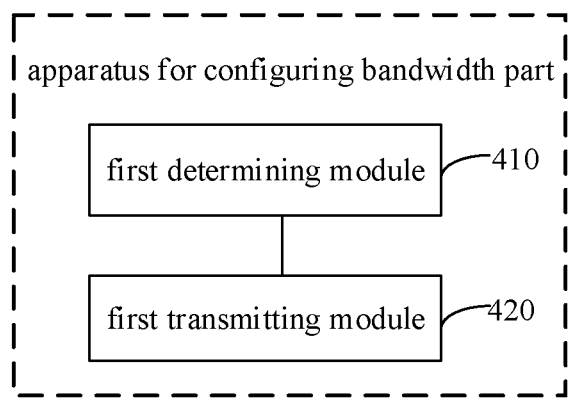
FIG. 14 is a block diagram illustrating an apparatus for configuring a bandwidth part according to some exemplary embodiments.

Referring to FIG. 14, FIG. 14 is a block diagram illustrating an apparatus for configuring a bandwidth part according to some exemplary embodiments. The apparatus may be for a base station that supports simultaneous transmission of multiple bandwidth parts. The apparatus includes a first determining module 410 and a first transmitting module 420.

The first determining module 410 is configured to determine first target indication information for indicating whether each bandwidth part in the multiple bandwidth parts is available.

The first transmitting module 420 is configured to simultaneously transmit the multiple bandwidth parts and the first target indication information to a terminal that supports simultaneous reception of the multiple bandwidth parts.

Figure 15:
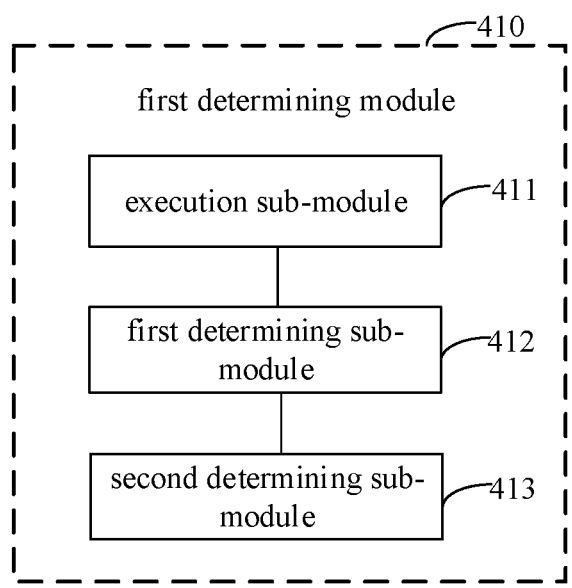
FIG. 15 is a block diagram illustrating another apparatus for configuring a bandwidth part according to some exemplary embodiments.

Referring to FIG. 15, FIG. 15 is a block diagram illustrating an apparatus for configuring a bandwidth part according to some exemplary embodiments as illustrated in FIG. 14. The first determining module 410 includes an execution sub-module 411, a first determining sub-module 412 and a second determining sub-module 413.

The execution sub-module 411 is configured to perform listen-before-talk LBT to each bandwidth part in the multiple bandwidth parts to obtain a LBT result corresponding to each bandwidth part.

The first determining sub-module 412 is configured to, in response that a LBT result corresponding to one bandwidth part in the multiple bandwidth parts is successful, determine a value corresponding to the bandwidth part as a first preset value, otherwise determine the value corresponding to the bandwidth part as a second preset value.

The second determining sub-module 413 is configured to sort the value corresponding to each bandwidth part in a preset order as the first target indication information.

Figure 16:
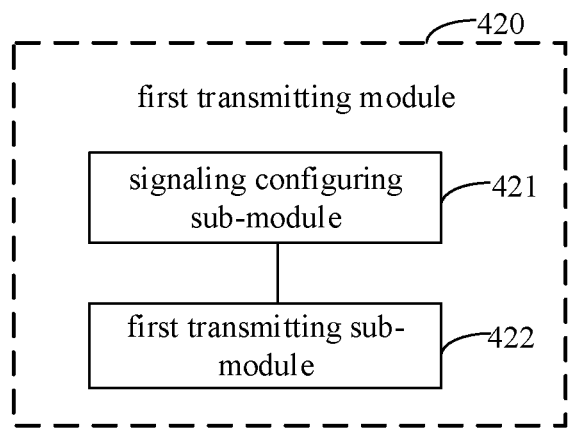
FIG. 16 is a block diagram illustrating another apparatus for configuring a bandwidth part according to some exemplary embodiments.

Referring to FIG. 16, FIG. 16 is a block diagram illustrating an apparatus for configuring a bandwidth part according to some exemplary embodiments as illustrated in FIG. 14. The first transmitting module includes a signaling configuring sub-module 421 and a first transmitting sub-module 422.

The signaling configuring sub-module 421 is configured to configure a downlink control signaling for the multiple bandwidth parts, the downlink control signaling for carrying the first target indication information.

The first transmitting sub-module 422 is configured to simultaneously transmit the multiple bandwidth parts to the terminal after carrying the downlink control signaling on at least one bandwidth part in the multiple bandwidth parts.

Figure 17:
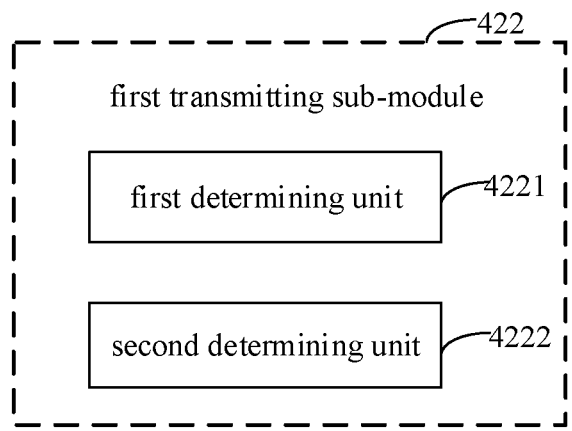
FIG. 17 is a block diagram illustrating another apparatus for configuring a bandwidth part according to some exemplary embodiments.

Referring to FIG. 17, FIG. 17 is a block diagram illustrating an apparatus for configuring a bandwidth part according to some exemplary embodiments as illustrated in FIG. 16. The first transmitting sub-module 422 includes a first determining unit 4221 or a second determining unit 4222.

The first determining unit 4221 is configured to use any one bandwidth part in the multiple bandwidth parts as the bandwidth part for carrying the downlink control signal.

The second determining unit 4222 is configured to use a bandwidth part whose LBT result is successful in the multiple bandwidth parts as the bandwidth part for carrying the downlink control signal.

Figure 18:
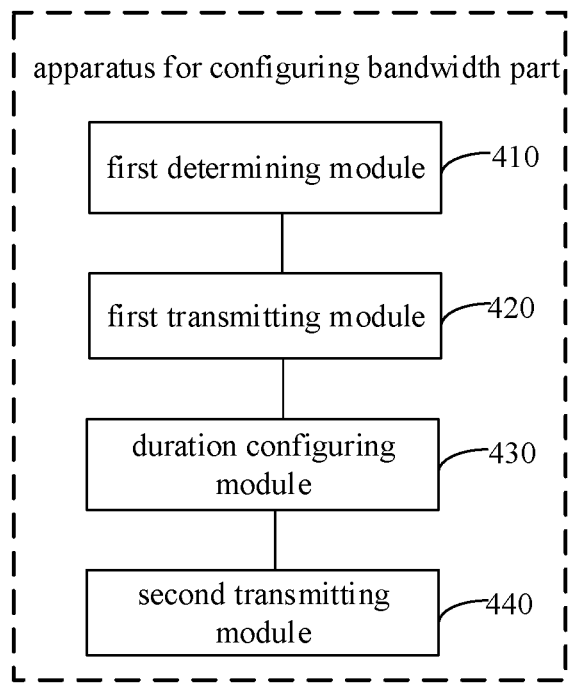
FIG. 18 is a block diagram illustrating another apparatus for configuring a bandwidth part according to some exemplary embodiments.

Referring to FIG. 18, FIG. 18 is a block diagram illustrating an apparatus for configuring a bandwidth part according to some exemplary embodiments as illustrated in FIG. 14. The apparatus further includes: a duration configuring module 430 and a second transmitting module 440.

The duration configuring module 430 is configured to configure occupation duration information that a spare bandwidth part is occupied; the spare bandwidth part being an unavailable bandwidth part in the multiple bandwidth parts.

The second transmitting module 440 is configured to transmit the occupation duration information to the terminal.

Figure 19:
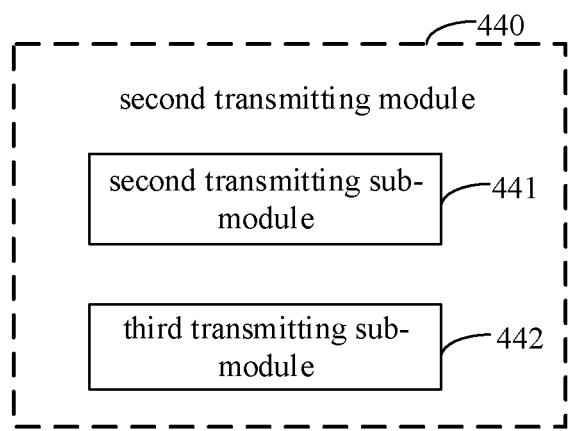
FIG. 19 is a block diagram illustrating another apparatus for configuring a bandwidth part according to some exemplary embodiments.

Referring to FIG. 19, FIG. 19 is a block diagram illustrating an apparatus for configuring a bandwidth part according to some exemplary embodiments as illustrated in FIG. 18. The second transmitting module 440 includes a second transmitting sub-module 441 or a third transmitting sub-module 442.

The second transmitting sub-module 441 is configured to transmit the occupation duration information to the terminal through downlink control information.

The third transmitting sub-module 442 is configured to transmit the occupation duration information to the terminal a radio resource control signaling.

Figure 20:
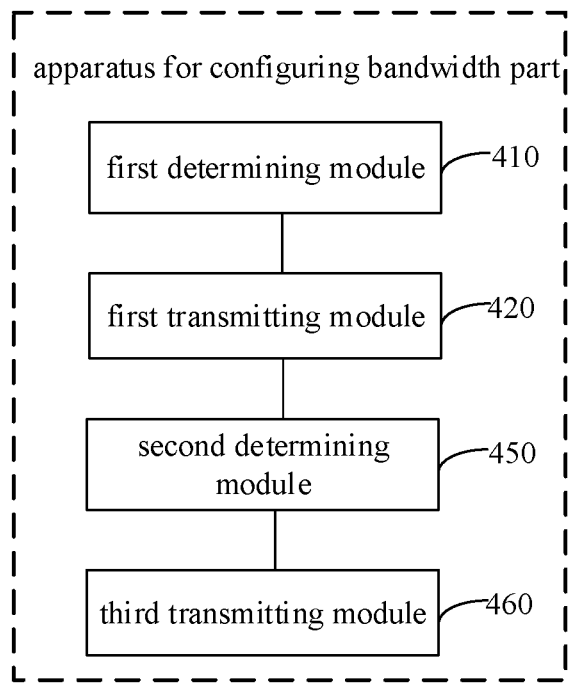
FIG. 20 is a block diagram illustrating another apparatus for configuring a bandwidth part according to some exemplary embodiments.

Referring to FIG. 20, FIG. 20 is a block diagram illustrating an apparatus for configuring a bandwidth part according to some exemplary embodiments as illustrated in FIG. 14. The apparatus further includes: a second determining module 450 and a third transmitting module 460.

The second determining module 450 is configured to determine second target indication information in response to satisfying a specified condition; the second target indication information for indicating whether each bandwidth part in the multiple bandwidth parts is available, and a number of available bandwidth parts indicated by the second target indication information being different from a number of available bandwidth parts indicated by the first target indication information.

The third transmitting module 460 is configured to transmit the second target indication information to the terminal.

The specified condition includes the following.

An amount of data change of downlink data to be transmitted exceeds a preset value.

Or, a request message from the terminal for requesting to change a number of available bandwidth parts in the multiple bandwidth parts is received.

Figure 21:
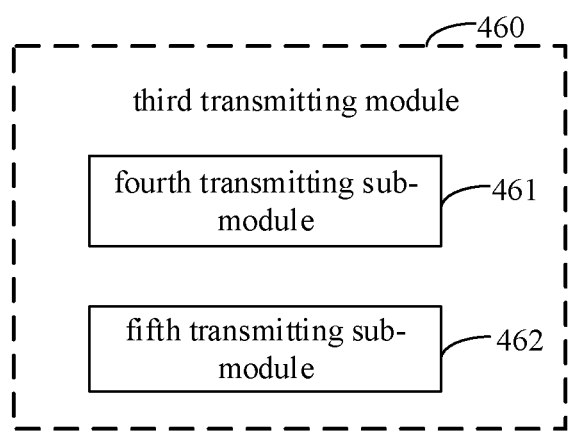
FIG. 21 is a block diagram illustrating another apparatus for configuring a bandwidth part according to some exemplary embodiments.

Referring to FIG. 21, FIG. 21 is a block diagram illustrating an apparatus for configuring a bandwidth part according to some exemplary embodiments as illustrated in FIG. 20. The third transmitting module includes: a fourth transmitting sub-module 461 or a fifth transmitting sub-module 462.

The fourth transmitting sub-module 461 is configured to transmit the second target indication information to the terminal through a radio resource control signaling.

The fifth transmitting sub-module 462 is configured to transmit the second target indication information to the terminal through a downlink control signaling.

Figure 22:
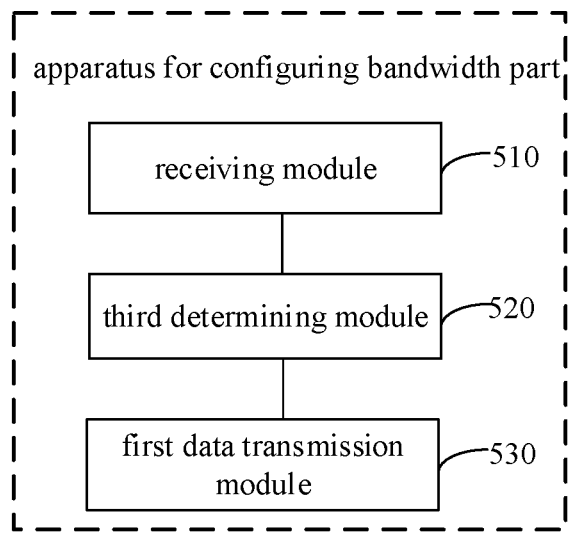
FIG. 22 is a block diagram illustrating another apparatus for configuring a bandwidth part according to some exemplary embodiments.

Referring to FIG. 22, FIG. 22 is a block diagram illustrating an apparatus for configuring a bandwidth part according to some exemplary embodiments. The apparatus may be for a terminal that supports simultaneous reception of multiple bandwidth parts. The apparatus includes: a receiving module 510, a third determining module 520 and a first data transmission module 530.

The receiving module 510 is configured to receive the multiple bandwidth parts and first target indication information simultaneously transmitted by a base station; the first target indication information for indicating whether each bandwidth part in the multiple bandwidth parts is available.

The third determining module 520 is configured to determine at least one available bandwidth part among the multiple bandwidth parts based on the first target indication information.

The first data transmission module 530 is configured to perform data transmission with the base station from a first target time unit through the at least one available bandwidth part; the first target time unit being a time unit following a time unit of receiving by the terminal the first target indication information.

Optionally, at least one bandwidth part in the multiple bandwidth parts carries a downlink control signaling, and the downlink control signaling carries the first target indication information.

Figure 23:
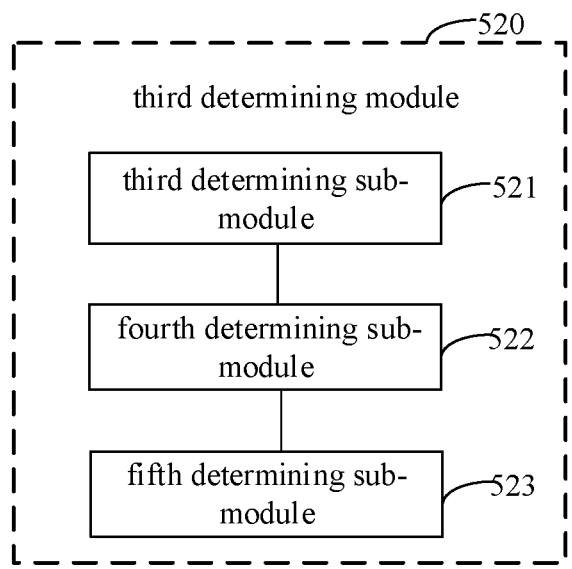
FIG. 23 is a block diagram illustrating another apparatus for configuring a bandwidth part according to some exemplary embodiments.

Referring to FIG. 23, FIG. 23 is a block diagram illustrating an apparatus for configuring a bandwidth part according to some exemplary embodiments illustrated in FIG. 22. The third determining module 520 includes a third determining sub-module 521, a fourth determining sub-module 522 and a fifth determining sub-module 523.

The third determining sub-module 521 is configured to determine a value corresponding to each bandwidth part through a preset order based on the first target indication information.

The fourth determining sub-module 522 is configured to determine the bandwidth part to be available in response that the value corresponding to one bandwidth part in the multiple bandwidth parts is a first preset value.

The fifth determining sub-module 523 is configured to determine the bandwidth part to be unavailable in response that the value corresponding to the bandwidth part is a second preset value.

Figure 24:
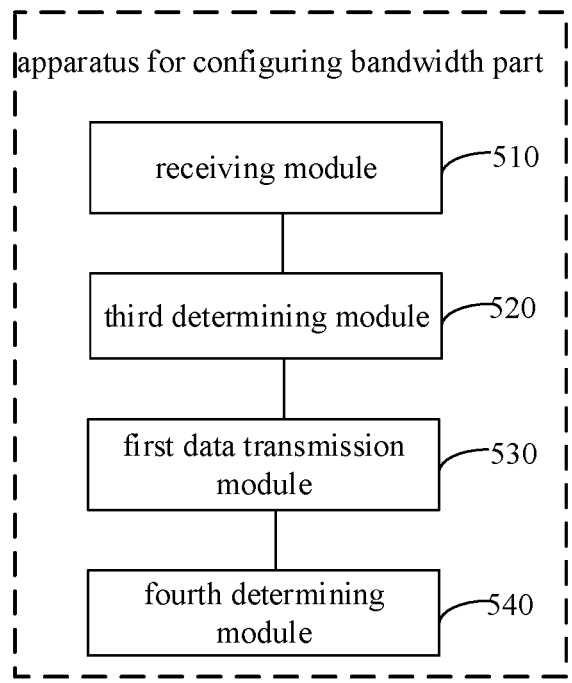
FIG. 24 is a block diagram illustrating another apparatus for configuring a bandwidth part according to some exemplary embodiments.

Referring to FIG. 24, FIG. 24 is a block diagram illustrating an apparatus for configuring a bandwidth part according to some exemplary embodiments illustrated in FIG. 22. The apparatus further includes: a fourth determining module 540.

The fourth determining module 540 is configured to determine occupation duration information that a spare bandwidth part is occupied; the spare bandwidth part being an unavailable bandwidth part in the multiple bandwidth parts.

Figure 25:
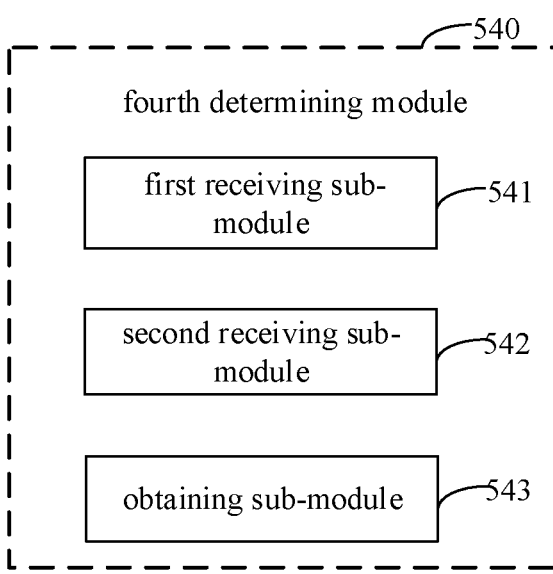
FIG. 25 is a block diagram illustrating another apparatus for configuring a bandwidth part according to some exemplary embodiments.

Referring to FIG. 25, FIG. 25 is a block diagram illustrating an apparatus for configuring a bandwidth part according to some exemplary embodiments illustrated in FIG. 24. The fourth determining module 540 includes a first receiving sub-module 541, or a second receiving sub-module 542, or an obtaining sub-module 543.

The first receiving sub-module 541 is configured to receive the occupation duration information transmitted by the base station through a downlink control signaling.

The second receiving sub-module 542 is configured to receive the occupation duration information transmitted by the base station through a radio resource control signaling.

The obtaining sub-module 543 is configured to obtain the occupation duration information pre-defined in a protocol.

Figure 26:
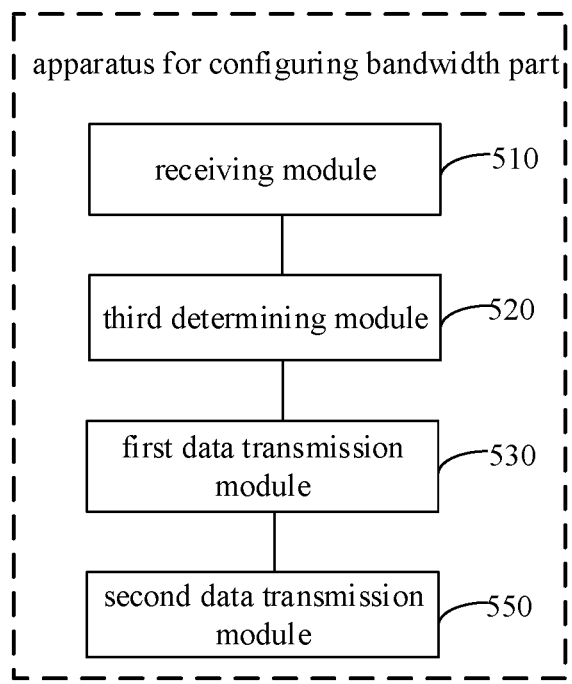
FIG. 26 is a block diagram illustrating another apparatus for configuring a bandwidth part according to some exemplary embodiments.

Referring to FIG. 26, FIG. 26 is a block diagram illustrating an apparatus for configuring a bandwidth part according to some exemplary embodiments illustrated in FIG. 22. The apparatus further includes: a second data transmission module 550.

The second data transmission module 550 is configured to perform data transmission with the base station from a second target time unit through an available bandwidth part indicated by second target indication information in response to receiving the second target indication information from the base station; the second target time unit being a time unit following a time unit of receiving by the terminal the second target indication information.

Figure 27:
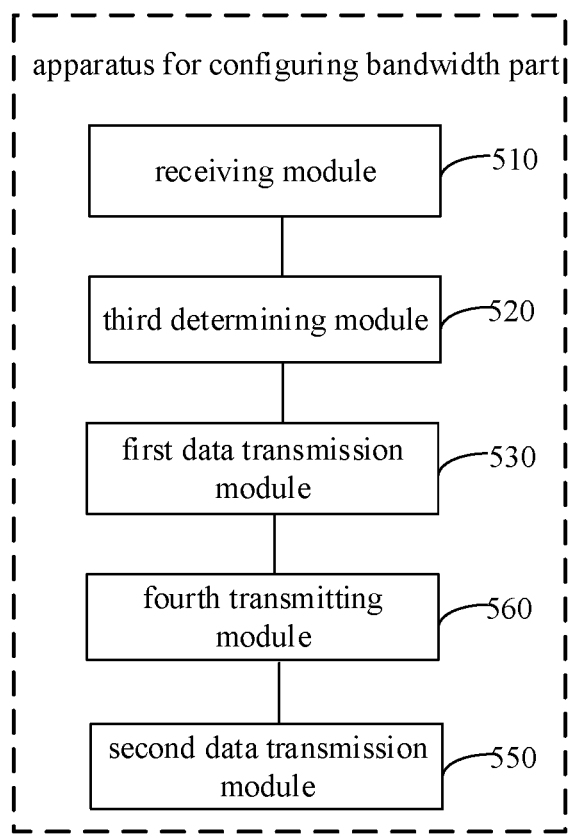
FIG. 27 is a block diagram illustrating another apparatus for configuring a bandwidth part according to some exemplary embodiments.

Referring to FIG. 27, FIG. 27 is a block diagram illustrating an apparatus for configuring a bandwidth part according to some exemplary embodiments illustrated in FIG. 26. The apparatus further includes: a fourth transmitting module 560.

The fourth transmitting module 560 is configured to transmit a request message for requesting to change a number of available bandwidth parts in the multiple bandwidth parts to the base station in response that an amount of data change of uplink data to be transmitted exceeds a preset value.

Figure 28:
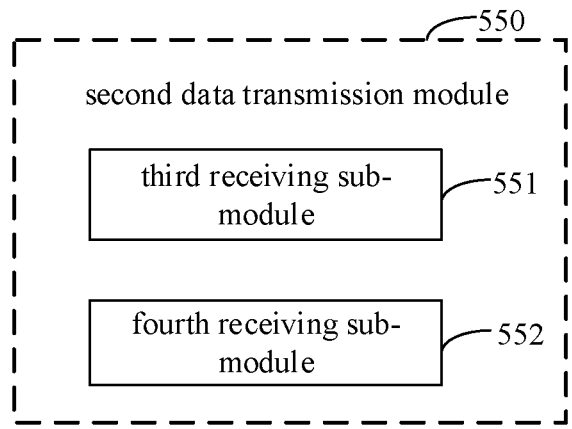
FIG. 28 is a block diagram illustrating another apparatus for configuring a bandwidth part according to some exemplary embodiments.

Referring to FIG. 28, FIG. 28 is a block diagram illustrating an apparatus for configuring a bandwidth part according to some exemplary embodiments illustrated in FIG. 26. The second data transmission module 550 includes a third receiving sub-module 551 or a fourth receiving sub-module 552.

The third receiving sub-module 551 is configured to receive the second target indication information from the base station through a radio resource control signaling.

The fourth receiving sub-module 552 is configured to receive the second target indication information from the base station through a downlink control signaling.

With respect to the apparatus embodiments, reference should be made to the description of the method embodiments for related parts since the apparatus embodiments basically corresponds to the method embodiments. The apparatus embodiments described above are merely illustrative. The units described above as separate components may or may not be physically separated, and the components displayed as units may or may not be physical units. That is, they may be located in one place or distributed to multiple network units. Some or all of the modules may be selected based on actual needs to achieve the objectives of the solutions of the disclosure. Those of ordinary skill in the art may understand and implement without creative work.

Accordingly, the disclosure further provides a computer-readable storage medium having stored therein computer instructions. The computer instructions may be for performing any method for configuring a bandwidth part for the base station side that supports simultaneous transmission of multiple bandwidth parts.

Accordingly, the disclosure further provides a computer-readable storage medium having stored therein computer instructions. The computer instructions may be for performing any method for configuring a bandwidth part for the terminal side that supports simultaneous reception of multiple bandwidth parts.

Accordingly, the disclosure further provides a device for configuring a bandwidth part. The device for configuring a bandwidth part is applicable to a base station that supports simultaneous transmission of multiple bandwidth parts.

The device includes a processor.

The device includes a memory for storing instructions executable by the processor.

The processor is configured to perform the following.

First target indication information is determined. The first target indication information may be for indicating whether each bandwidth part in the multiple bandwidth parts is available.

The multiple bandwidth parts and the first target indication information are simultaneously transmitted to a terminal that supports simultaneous reception of the multiple bandwidth parts.

Figure 29:
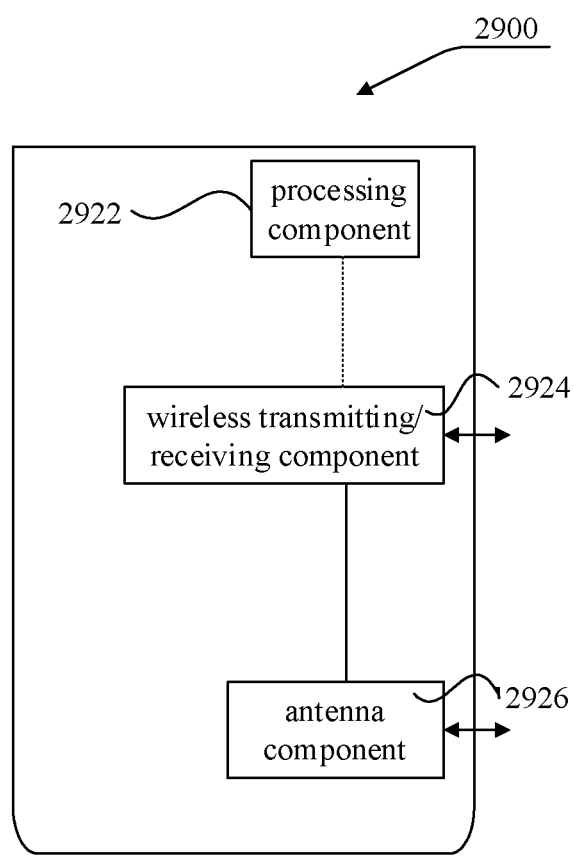
FIG. 29 is a block diagram illustrating a device for configuring a bandwidth part according to some exemplary embodiments.

Referring to FIG. 29, FIG. 29 is a block diagram illustrating a device 2900 for configuring a bandwidth part according to some exemplary embodiments. The device 2900 may be configured as a base station that supports simultaneous transmission of multiple bandwidth parts. As illustrated in FIG. 29, the device 2900 may include a processing component 2922, a wireless transmitting/receiving component 2924, an antenna component 2926, and a signal processing part specific to the wireless interface. The processing component 2922 may further include one or more processors.

One of the processors in the processing component 2922 may be configured to execute any of the foregoing methods for configuring a bandwidth part for a base station that supports simultaneous transmission of multiple bandwidth parts.

Accordingly, the disclosure further provides a device for configuring a bandwidth part. The device for configuring a bandwidth part is applicable to a terminal that supports simultaneous reception of multiple bandwidth parts.

The device includes a processor.

The device includes a memory for storing instructions executable by the processor.

The processor is configured to perform the following.

The multiple bandwidth parts and first target indication information simultaneously transmitted by a base station, are received. The first target indication information may be for indicating whether each bandwidth part in the multiple bandwidth parts is available.

At least one available bandwidth part is determined among the multiple bandwidth parts based on the first target indication information.

Data transmission with the base station is performed from a first target time unit through the at least one available bandwidth part; the first target time unit being a time unit following a time unit of receiving by the terminal the first target indication information.

Figure 30:
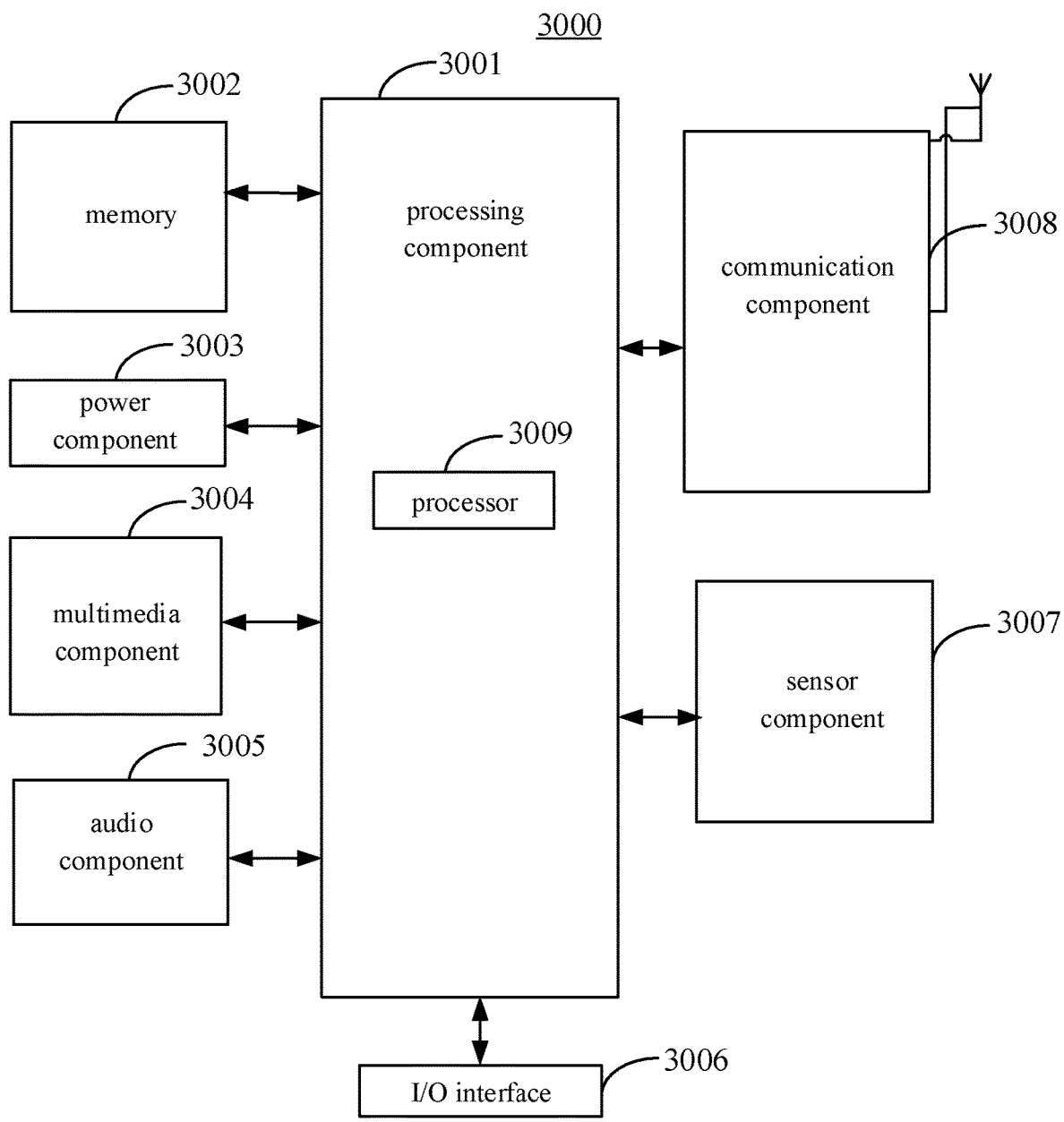
FIG. 30 is a block diagram illustrating another device for configuring a bandwidth part according to some exemplary embodiments.

FIG. 30 is a block diagram illustrating another device for configuring a bandwidth part according to some exemplary embodiments. As illustrated in FIG. 30, according to exemplary embodiments, another device 3000 for configuring a bandwidth part may be shown. The device 3000 may be a computer, a mobile phone, a digital broadcast terminal, a messaging device, a gaming console, a tablet, a medical device, exercise equipment, a personal digital assistant, and the like.

Referring to FIG. 30, the device 3000 may include one or more of the following components: a processing component 3001, a memory 3002, a power component 3003, a multimedia component 3004, an audio component 3005, an input/output (I/O) interface 3006, a sensor component 3007, and a communication component 3008.

The processing component 3001 typically controls overall operations of the device 3000, such as the operations associated with display, telephone calls, data communications, camera operations, and recording operations. The processing component 3001 may include one or more modules which facilitate the interaction between the processing component 3001 and other components. For instance, the processing component 3001 may include a multimedia module to facilitate the interaction between the multimedia component 3004 and the processing component 3001.

The memory 3002 is configured to store various types of data to support the operation of the device 3000. Examples of such data include instructions for any applications or methods operated on the device 3000, contact data, phonebook data, messages, pictures, video, etc. The memory 3002 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3003 provides power to various components of the device 3000. The power component 3003 may include a power management system, one or more power sources, and any other components associated with the generation, management, and distribution of power in the device 3000.

The multimedia component 3004 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3004 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3005 is configured to output and/or input audio signals. For example, the audio component 3005 includes a microphone ("MIC") configured to receive an external audio signal when the device 3000 is in an operation mode, such as a call mode, a recording mode, and a voice recognition mode. The received audio signal may be further stored in the memory 3002 or transmitted via the communication component 3008. In some embodiments, the audio component 3005 further includes a speaker to output audio signals.

The I/O interface 3006 provides an interface between the processing component 3001 and peripheral interface modules, such as a keyboard, a click wheel, buttons, and the like. The buttons may include, but are not limited to, a home button, a volume button, a starting button, and a locking button.

The sensor component 3007 includes one or more sensors to provide status assessments of various aspects of the device 3000. For instance, the sensor component 3007 may detect an open/closed status of the device 3000, relative positioning of components, e.g., the display and the keypad, of the device 3000, a change in position of the device 3000, or a component of the device 3000, a presence or absence of user contact with the device 3000, an orientation or an acceleration/deceleration of the device 3000, and a change in temperature of the device 3000. The sensor component 3007 may include a proximity sensor configured to detect the presence of nearby objects without any physical contact. The sensor component 3007 may also include a light sensor, such as a CMOS or CCD image sensor, for use in imaging applications. In some embodiments, the sensor component 3007 may also include an accelerometer sensor, a gyroscope sensor, a magnetic sensor, a pressure sensor, or a temperature sensor.

The communication component 3008 is configured to facilitate communication, wired or wirelessly, between the device 3000 and other devices. The device 3000 can access a wireless network based on a communication standard, such as WiFi, 2G, or 3G, or a combination thereof. In one exemplary embodiment, the communication component 3008 receives a broadcast signal or broadcast associated information from an external broadcast management system via a broadcast channel. In one exemplary embodiment, the communication component 3008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3002, executable by the processor 3009 in the device 3000, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 3000 is capable of performing any of the above methods for configuring a bandwidth part for a terminal side that supports simultaneous reception of the multiple bandwidth parts.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the claimed invention only be limited by the appended claims.

What is claimed is:

1. A method for configuring a bandwidth part, performed by a base station supporting simultaneous transmission of multiple bandwidth parts, comprising:
   determining first target indication information for indicating whether each bandwidth part in the multiple bandwidth parts is available; and
   after carrying a downlink control signaling on at least one bandwidth part in the multiple bandwidth parts, simultaneously transmitting on the multiple bandwidth parts to a terminal that supports simultaneous reception of the multiple bandwidth parts, wherein the downlink control signaling carries the first target indication information;
   wherein the at least one bandwidth part for carrying the downlink control signaling is determined by the following manner:

using bandwidth parts whose LBT result is successful in the multiple bandwidth parts as the bandwidth parts for carrying the downlink control signal;

wherein the method further comprises:

determining second target indication information in response to satisfying a specified condition; the second target indication information for indicating whether each bandwidth part in the multiple bandwidth parts is available, and a number of available bandwidth parts indicated by the second target indication information being different from a number of available bandwidth parts indicated by the first target indication information; and transmitting the second target indication information to the terminal, wherein the specified condition comprises: an amount of data change of downlink data to be transmitted exceeding a preset value;

wherein the method further comprises:

configuring occupation duration information that a spare bandwidth part is occupied; the spare bandwidth part being an unavailable bandwidth part in the multiple bandwidth parts, and transmitting the occupation duration information to the terminal through downlink control information or transmitting the occupation duration information to the terminal through a radio resource control signaling.

2. The method as claimed in claim 1, wherein determining the first target indication information comprises:

performing listen-before-talk LBT to each bandwidth part in the multiple bandwidth parts to obtain a LBT result corresponding to each bandwidth part;

in response that a LBT result corresponding to one bandwidth part in the multiple bandwidth parts is successful, determining a value corresponding to the bandwidth part as a first preset value, otherwise determining the value corresponding to the bandwidth part as a second preset value; and sorting the value corresponding to each bandwidth part in a preset order as the first target indication information.

3. The method as claimed in claim 1, wherein the bandwidth part for carrying the downlink control signaling is further determined by the following manner:

using any one bandwidth part in the multiple bandwidth parts as the bandwidth part for carrying the downlink control signal.

4. The method as claimed in claim 1, wherein the specified condition further comprises:

receiving a request message from the terminal for requesting to change a number of available bandwidth parts in the multiple bandwidth parts.

5. The method as claimed in claim 1, wherein transmitting the second target indication information to the terminal comprises:

transmitting the second target indication information to the terminal through a radio resource control signaling; or transmitting the second target indication information to the terminal through a downlink control signaling.

6. A non-transitory computer-readable storage medium having stored therein instructions that performs the method for configuring a bandwidth part according to claim 1.

7. A method for configuring a bandwidth part, performed by a terminal supporting simultaneous reception of multiple bandwidth parts, comprising:

receiving on the multiple bandwidth parts and first target indication information simultaneously transmitted by a base station; the first target indication information for indicating whether each bandwidth part in the multiple bandwidth parts is available;

determining at least one available bandwidth part among the multiple bandwidth parts based on the first target indication information; and performing data transmission with the base station from a first target time unit through the at least one available bandwidth part; the first target time unit being a time unit following a time unit of receiving by the terminal the first target indication information;

wherein at least one bandwidth part in the multiple bandwidth parts carries a downlink control signaling, and the downlink control signaling carries the first target indication information;

wherein bandwidth parts whose LBT result is successful in the multiple bandwidth parts are used as the bandwidth parts for carrying the downlink control signal;

wherein the method further comprises:

performing data transmission with the base station from a second target time unit through an available bandwidth part indicated by second target indication information in response to receiving the second target indication information from the base station; the second target time unit being a time unit following a time unit of receiving by the terminal the second target indication information;

wherein the second target indication information is sent from the base station in response to satisfying a specified condition;

wherein the specified condition comprises: an amount of data change of downlink data to be transmitted exceeding a preset value;

wherein the method further comprises: determining occupation duration information that a spare bandwidth part is occupied; the spare bandwidth part being an unavailable bandwidth part in the multiple bandwidth parts;

wherein determining the occupation duration information that the spare bandwidth part is occupied comprises any one of:

receiving the occupation duration information transmitted by the base station through downlink control information;

receiving the occupation duration information transmitted by the base station through a radio resource control signaling; and obtaining the occupation duration information pre-defined in a protocol.

8. The method as claimed in claim 7, wherein determining the at least one available bandwidth part among the multiple bandwidth parts based on the first target indication information comprises:

determining a value corresponding to each bandwidth part through a preset order based on the first target indication information;

determining the bandwidth part to be available in response that the value corresponding to one bandwidth part in the multiple bandwidth parts is a first preset value; and determining the bandwidth part to be unavailable in response that the value corresponding to the bandwidth part is a second preset value.

9. The method as claimed in claim 7, before receiving the second target indication information from the base station, further comprising:

transmitting a request message for requesting to change a number of available bandwidth parts in the multiple bandwidth parts to the base station in response that an amount of data change of uplink data to be transmitted exceeds a preset value.

10. The method as claimed in claim 7, wherein the second target indication information from the base station is received by one of the following manners:
receiving the second target indication information from the base station through a radio resource control signaling; or
receiving the second target indication information from the base station through a downlink control signaling.

11. A device for configuring a bandwidth part, comprising:
a processor; and
a memory for storing instructions executable by the processor;
wherein the processor is configured to perform the method as claimed in claim 7.

12. A device for configuring a bandwidth part, comprising:
a processor; and
a memory for storing instructions executable by the processor;
wherein the processor is configured to:
determine first target indication information for indicating whether each bandwidth part in multiple bandwidth parts is available; and
after carrying a downlink control signaling on at least one bandwidth part in the multiple bandwidth parts, simultaneously transmit on the multiple bandwidth parts to a terminal that supports simultaneous reception of the multiple bandwidth parts, wherein the downlink control signaling carries the first target indication information;
wherein the at least one bandwidth part for carrying the downlink control signaling is determined by the following manner:
using bandwidth parts whose LBT result is successful in the multiple bandwidth parts as the bandwidth parts for carrying the downlink control signal;
wherein the processor is further configured to:
determine second target indication information in response to satisfying a specified condition; the second target indication information for indicating whether each bandwidth part in the multiple bandwidth parts is available, and a number of available bandwidth parts indicated by the second target indication information being different from a number of available bandwidth parts indicated by the first target indication information; and
transmit the second target indication information to the terminal,
wherein the specified condition comprises: an amount of data change of downlink data to be transmitted exceeding a preset value;
wherein the processor is further configured to:
configure occupation duration information that a spare bandwidth part is occupied; the spare bandwidth part being an unavailable bandwidth part in the multiple bandwidth parts, and
transmit the occupation duration information to the terminal through downlink control information or transmitting the occupation duration information to the terminal through a radio resource control signaling.

* * * * *